(12) United States Patent
Li et al.

(10) Patent No.: US 8,907,015 B2
(45) Date of Patent: Dec. 9, 2014

(54) COPOLYMER OF PYRENE AND PYRROLE AND METHOD OF PRODUCING THE COPOLYMER

(75) Inventors: Xin-Gui Li, Shanghai (CN); Mei-rong Huang, Shanghai (CN); Zhenzhong Hou, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 13/133,936

(22) PCT Filed: Jun. 4, 2010

(86) PCT No.: PCT/CN2010/073536
§ 371 (c)(1),
(2), (4) Date: Jun. 9, 2011

(87) PCT Pub. No.: WO2011/150573
PCT Pub. Date: Dec. 8, 2011

(65) Prior Publication Data
US 2012/0277405 A1    Nov. 1, 2012

(51) Int. Cl.
*C08G 73/06* (2006.01)
*C08G 79/04* (2006.01)
*H05B 33/14* (2006.01)
*C09K 11/06* (2006.01)
*C08F 232/08* (2006.01)
*C08G 61/12* (2006.01)
*C08F 226/06* (2006.01)
*C08F 234/00* (2006.01)
*C08G 73/00* (2006.01)
*C08G 79/00* (2006.01)

(52) U.S. Cl.
CPC ........ *C08F 226/06* (2013.01); *C08G 2261/314* (2013.01); *H05B 33/14* (2013.01); *C09K 11/06* (2013.01); *C09K 2211/1416* (2013.01); *C08F 232/08* (2013.01); *C09K 2211/1466* (2013.01); *C08G 61/124* (2013.01); *C08G 2261/3221* (2013.01); *C08G 2261/43* (2013.01); *C08F 234/00* (2013.01)
USPC ............. 525/103; 525/93; 525/540; 528/396; 528/423; 528/424

(58) Field of Classification Search
USPC ............. 525/103, 93, 540; 528/396, 423, 424
See application file for complete search history.

(56) References Cited

U.S. PATENT DOCUMENTS 5,157,261 A    10/1992    Grey et al.
5,237,631 A    8/1993    Gavish et al.
(Continued)

FOREIGN PATENT DOCUMENTS

CN    1142510    2/1997
CN    1978439    6/2007
(Continued)

OTHER PUBLICATIONS

Bargon, et al., "Electromechanical Synthesis of Electronically Conducting Polymers from Aromatic Compunds", IBM J. Res. Develop. 1983, 27:330-341.

(Continued)

*Primary Examiner* — Duc Truong
(74) *Attorney, Agent, or Firm* — Knobbe, Martens, Olson & Bear LLP

(57) ABSTRACT

The present application provides a copolymer including one or more units of pyrene and one or more units of pyrrole. The present application also provides a method of producing a copolymer, including incubating pyrene monomer and pyrrole monomer with an oxidant in the presence of a reaction solvent. Uses of the copolymers are also provided.

23 Claims, 10 Drawing Sheets

(56) References Cited

U.S. PATENT DOCUMENTS

| | | | |
|---|---|---|---|
| 5,256,462 | A | 10/1993 | Callahan et al. |
| 5,306,642 | A | 4/1994 | Reagen et al. |
| 5,661,040 | A | 8/1997 | Huff et al. |
| 5,882,621 | A | 3/1999 | Doddapaneni et al. |
| 6,503,427 | B1 | 1/2003 | Yamamoto et al. |
| 7,208,122 | B2 | 4/2007 | Swager et al. |
| 7,416,703 | B2 | 8/2008 | Murray et al. |

FOREIGN PATENT DOCUMENTS

| | | |
|---|---|---|
| CN | 101139317 | 3/2008 |
| EP | 0374593 A1 | 6/1990 |
| EP | 1389626 | 2/2004 |
| JP | 63-308032 A | 12/1988 |
| JP | H05-132547 | 5/1993 |
| JP | 2004-075980 A | 11/2004 |
| JP | 2007-258335 A | 4/2007 |
| JP | 2008-120999 A | 5/2008 |

OTHER PUBLICATIONS

Lu, et al., "Electromechanical Polymerization of Pyrene in the Electrolyte of Boron Trifluoride Diethyl Etherate Containing Trifluoroacetic Acid and Polyethylene Glycol Oligomer", Journal of Electroanalytical Chemistry, 2006, 586:154-160.

Lu, et al., "Electrochemical Fabrication of Neuron-Type Networks Based on Crystalline Oligopyrene Nanosheets", Electrochimica Acta, 2005, 51:340-346.

Qu, et al., "Crystalline Oligopyrene Nanowires with Multicolored Emission", Chem. Commun., 2004, 280-2801.

Bai, et al., "Rapid Nitroaromatic Compounds Sensing Based on Oligopyrene", Sensors and Actuators B, 2008, 130:777-782.

Ballou, et al., "Tumor Detection and Visualization Using Cyanine Fluorochrome Labeled Antibodies", Biotechnol. Prog., 1997, 13:649-658.

Zhang, et al., "A Ratiometric Fluorescent Probe Based on Fret for Imaging $Hg^{2+}$ Ions in Living Cells", Angew. Chem. Int. Ed., 2008, 47:8025-8029.

McQuade, et al., "Conjugated Polymer-Based Chemical Sensors", Chemical Reviews, 2000, 100:2537-2574.

Thomas, et al., "Chemical Sensors Based on Amplifying Fluorescent Conjugated Polymers", Chemical Reviews, 2007, 107:1339-1386.

Okamoto, et al., "Pyrene-Labeled Base-Discriminating Fluorescent DNA Probes for Homogeneous SNP Typing", Journal of the American Chemical Society, 2004, 126:4820-4827.

Yamana, et al., "Bis-Pyrene-Labeled Molecular Beacon: A Monomer-Excimer Switching Probe for the Detection of DNA Base Alteration", Biooganic and Medicinal Chemistry, 2008, 16:78-83.

Goodpaster, et al., "Fluorescence Quenching as an Indirect Detection Method for Nitrated Explosives", Analytical Chemistry, 2001, 73:1004-2011.

Thomas, et al., "Novel Green Light-Emitting Carbazole Derivatives: Potential Electroluminescent Matterals", Advanced Materials, 2000, 12:1949-1951.

Oh, et al., "Efficient Blue Organic Light-Emitting Diodes Using Newly-Developed Pyrene-Based Electron Transport Materials", Organic Electronics, 2009, 10:163-169.

Basu, et al., "Study of the Mechanism of Degradation of Pyrene-Based Pressure Sensitive Paints", Sensors and Actuators B, 2003, 94:257-266.

Figueira-Duarte, et al., "Polypyrene Dendrimers", Angew. Chem. Int. Ed., 2008, 47:10175-10178.

Wang, et al., "Synthesis and Characterization of a Novel 1,4-Naphthalene-Based Thiophene Copolymers", Thin Films, 2002, 417:211-214.

Pei, et al., "Thiophene-Based Conjugated Polymers for Light-Emitting Diodes: Effect of Aryl Groups on Photoluminescence Efficiency and Redox Behavior", Macromolecules, 2001, 34:7241-7248.

Hino, et al., "Ultraviolet Photoelectron Spectra of Electropolymerized Polymers: Polyazulene, Polypyrene and Polycarbazole", Snyth. Met. 1994, 64:259-264. Abstract Only.

Kogure, et al., "A Fluorescent Variant of a Protein from the Stony Coral Montipora Facilitates Dual-Color Single-Laser Fluorescence Cross-Correlation Spectroscopy", A. Nat. Biotechnol., 2006, 24:577-581. Abstract Only.

Jang, et al., "Facile Fabrication of Photochromic Dye-Conducting Polymer Core-Shell Nanomaterials and Their Photoluminescence", Adv. Mater. 2003, 15: 977-980.

Ding, Shou-Nian, "Electrochemical Fabrication of Novel Fluorescent Polymeric Film: Poly(Pyrrole-Pyrene)", Electrochemistry Communication, 2008, 10:1423-1426.

International Search Report and Written Opinion, Mailed on Mar. 17, 2011, for Application No. PCT/CN2010/073536, filed Jun. 4, 2010.

ASTM Standard E 285-80 "Standard Test Method for Oxyacetylene Ablation Testing of Thermal Insulation Materials," ASTM International, West Conshohocken, PA (2002).

Benedek, I. "Developments in pressure-sensitive products," Edition 2, Chapter 2, pp. 6-49, CRC press (2005).

Brabec, C. J. et al, "Plastic Solar Cells," Advanced Functional Materials, vol. 11, Issue 1, pp. 15-26, Wiley-VCH Verlag GmbH (2001).

Ebbesen, T.W. "Carbon Nanotubes," Physics Today, pp. 26-32, American Institute of Physics (1996).

Fauteux, D., et al, "Lithium polymer electrolyte rechargeable battery," Electrochimica Acta, vol. 40, Issue 13-14, pp. 2185-2190 (1995).

Gardner, J. W., and Yinon, J., "Electronic noses & sensors for the detection of explosives," Springer, Chapter 4, pp. 53-130 (2004).

Grone, M.J.L., et al., "Landmine detection by chemical signature: Detection of vapors of nitroaromatic compounds by fluorescence quenching of novel polymer materials," Proceedings of SPIE, the International Society for Optical Engineering, vol. 3710, No. 1, pp. 409-420 (1999).

Kumaraswamy, S., et al, "Fluorescent-conjugated polymer superquenching facilitates highly sensitive detection of proteases," Proceedings of National Academy of Sciences, vol. 101, No. 20, pp. 7511-7515 (2004).

Menczel, J., and Prime, B., "Thermal Analysis of Polymers, Fundamentals and Applications," John Wiley & Sons, Inc., Chapter 3, pp. 241-311 (2009).

Morgan, "Carbon fibers and their composites," Materials Engineering Series, vol. 27, Chapter 4, pp. 121-175, CRC press (2005).

Najim, T.S., et al., "Thermal and Ablative Properties of Ipns and Composites of High Ortho Resole Resin and Difurfurylidene Acetone, Leonardo Electronic Journal of Practices and Technologies," Issue 13, pp. 34-46 (2008).

Nielen, M. W. F., and Malucha, S., "Characterization of polydisperse synthetic polymers by size-exclusion chromatography/matrix-assisted laser desorption/ionization time-of-flight mass spectrometry," Repid Communications in mass Spectrometry, vol. 11, p. 1194 (1997).

Sirringhaus, H., et al, "Integrated Optoelectronic Devices Based on Conjugated Polymers," Science, vol. 280, pp. 1741-1744 (1998).

Skotheim, T.A., and Reynolds, J., "Conjugated polymers: processing and applications," Third Edition, Chapter 13, pp. 13-20, CRC Press (2006).

Strong, A. B., et al, "Fundamentals of Composites Manufacturing: Materials, Methods and Applications," Second Edition, SME, pp. 186-188 (2007).

Toal, S. J., and Trogler, W.C., "Polymer sensors for nitroaromatic explosives detection," Journal of Materials Chemistry, Vol. 16, pp. 2871-2883, The Royal Society of Chemistry (2006).

Xu, H., et al, "Magnetically assisted DNA assays: high selectivity using conjugated polymers for amplified fluorescent transduction," Nucleic Acids Research, vol. 33, No. 9, pp. 1-7 (2005).

COPOLYMER OF PYRENE AND PYRROLE AND METHOD OF PRODUCING THE COPOLYMER

CROSS-REFERENCE TO RELATED APPLICATIONS

This application is the U.S. National Phase under 35 U.S.C. §371 of International Application No. PCT/CN2010/073536, filed Jun. 4, 2010. The International Application was filed in English. The contents of the International Application are hereby incorporated by reference in their entirety.

BACKGROUND

Pyrene is a polycyclic aromatic compound consisting of four benzene rings fused together. Pyrene exhibits high quantum yield, good photostability, and long fluorescence lifetime. Pyrene and its derivatives are often used to make fluorescent dyes, biological probes, sensors, photoelectronic devices, and press-sensitive materials.

Polypyrenes have longer π-conjugation chains than pyrene monomers, and are expected to possess better fluorescence, electroluminescence and thermostability. Recently, oligopyrene has been synthesized by an electrochemical method, and it is found that oligopyrene formed by $\alpha,\alpha$-coupling of pyrene rings can emit about 9 times stronger and more unitarily colored fluorescence than the pyrene monomers. However, oligopyrene shows dissatisfactory solubility and processibility. In addition, the electrochemical method for synthesizing oligopyrene is expensive and has low production yield and thus not suitable for large-scale manufacture.

Pyrrole is a heterocyclic aromatic compound with a five-membered ring. Polypyrrole has high thermal stability and excellent electrical conducting activity. Pyrrole may be used as a material for electrochromic devices, organic transistor suppercapacitors, chemical sensors and biosensors.

SUMMARY

The present disclosure provides a copolymer of pyrene and pyrrole and uses thereof. Methods of producing the copolymer are also provided.

In one aspect, the present disclosure provides a copolymer including one or more units of pyrene and one or more units of pyrrole. In certain embodiments, the pyrene and pyrrole are randomly distributed in the copolymer chain.

In another aspect, the present disclosure provides a method of producing a copolymer of pyrene and pyrrole, including incubating pyrene monomers and pyrrole monomers with an oxidant in the presence of a reaction solvent.

In another aspect, the present disclosure provides the uses of a copolymer of pyrene and pyrrole. In certain embodiments, the copolymer can be used as biosensors, chemical sensors as well as fluorescence sensors. In certain embodiments, the copolymer can be used for manufacturing light emitting diodes, press-sensitive materials, batteries, thermal resistant materials, and precursors of carbon materials.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
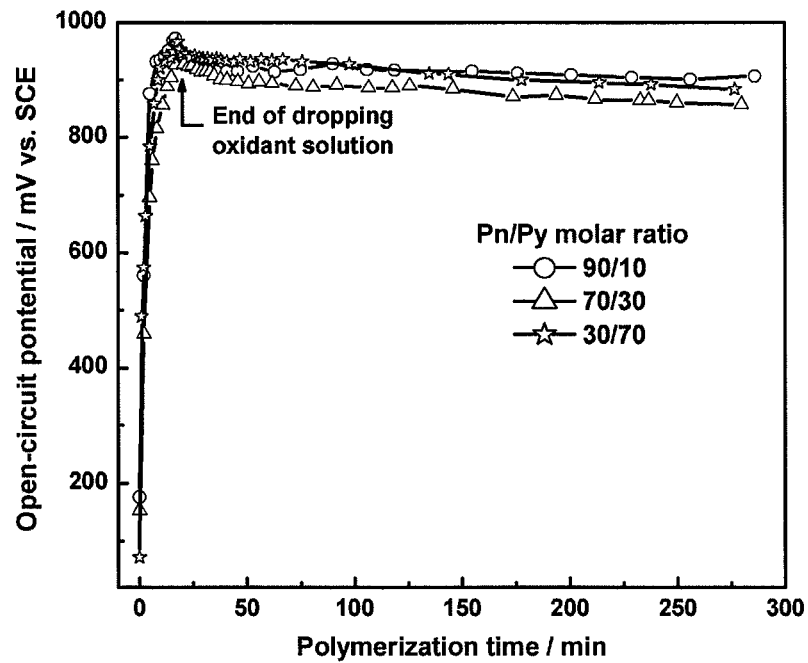
FIG. 1 shows the changes of open-circuit potential in reaction systems for polymerization of pyrene and pyrrole at different molar ratios of 90/10, 70/30, and 30/70.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Copolymer

In one aspect, the present disclosure provides a copolymer including one or more units of pyrene and one or more units of pyrrole. In an illustrative embodiment, the molar ratio of pyrene to pyrrole in the copolymer is in the range from 99:1 to 1:99, from 99:1 to 75:25, from 99:1 to 70:30, from 99:1 to 60:40, from 99:1 to 50:50, from 99:1 to 40:60, from 99:1 to 30:70, from 80:20 to 30:70, from 80:20 to 40:60, or from 80:20 to 50:50. In another illustrative embodiment, the molar ratio of pyrene to pyrrole in the copolymer is no less than 70:30, no less than 75:25, no less than 80:20, no less than 85:15, no less than 90:10, or no less than 95:5. In another illustrative embodiment, the molar ratio of pyrene to pyrrole in the copolymer is about 99:1, about 95:5, about 80:20, about 75:25, about 70:30, about 60:40, about 50:50, about 40:60, or about 30:70.

In an illustrative embodiment, the present disclosure provides a copolymer of pyrene and pyrrole, in which pyrene and pyrrole are randomly distributed with respect to one another on the copolymer chain. The term "randomly distributed" means that the pyrene monomers and pyrrole monomers may be lined up in the copolymer chain in any random pattern, for example, a pyrene monomer may be located between two pyrrole monomers on the copolymer chain, or a pyrene monomer may be located between a pyrrole monomer and another pyrene monomer, or a pyrrole monomer may be located between two pyrene monomers, or a pyrrole monomer may be located between a pyrene monomer and another pyrrole monomer.

In an illustrative embodiment, the present disclosure provides a copolymer of pyrene and pyrrole, in which the copolymer has the structure of Structure 1:

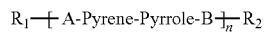

Structure 1 wherein,

-Pyrene-Pyrrole- includes, but is not limited to one or more of: Structure PP1 and Structure PP2:

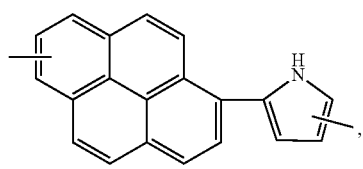

Structure PP1

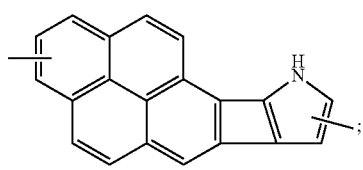

Structure PP2

A includes, but is not limited to one or more of: nothing, Structure PN1, Structure PY1, Structure PP1 (defined as supra), Structure PP2 (defined as supra), Structure PP3, Structure PP4, Structure PP5, and Structure PP6:

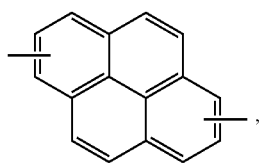

Structure PN1

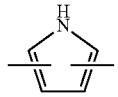

Structure PY1

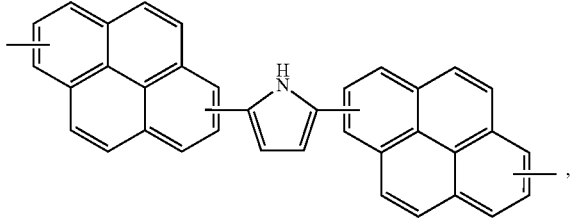

Structure PP3

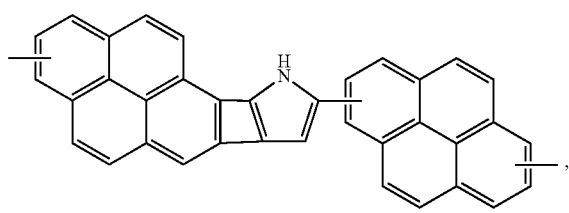

Structure PP4

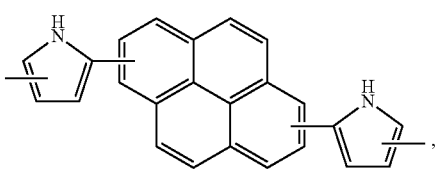

Structure PP5

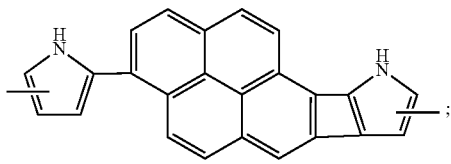

Structure PP6

B includes, but is not limited to one or more of: nothing, Structure PN1, Structure PN2, Structure PN3, Structure PY1, Structure PP1 (defined as supra), Structure PP2 (defined as supra), Structure PP3, Structure PP4, Structure PP5, Structure PP6, defined as supra;

n is any integer from 1 to 40;

$R_1$ includes, but is not limited to one or more of: H, Structure PN2, Structure PY2, Structure PP7, Structure PP8, Structure PP9, Structure PP10, Structure PP11, Structure PP12, Structure PP13, Structure PP14, Structure PP15, and Structure PP16:

Structure PN2,

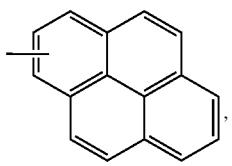

Structure PY2,

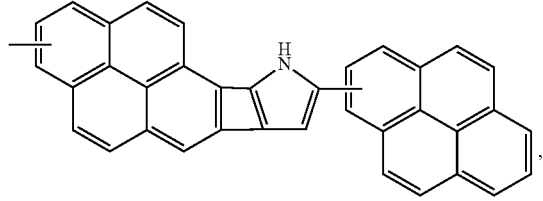

Structure PP7,

Structure PP8,

Structure PP9,

Structure PP10,

Structure PP11,

Structure PP12,

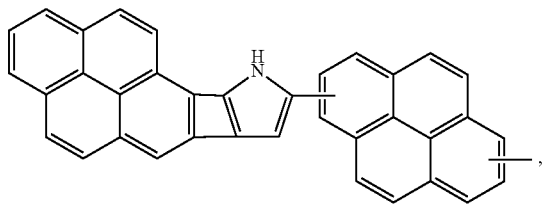

Structure PP13,

Structure PP14,

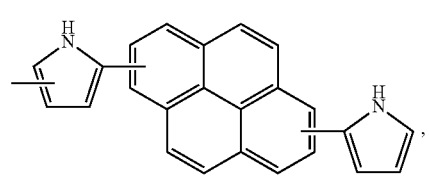

Structure PP15,

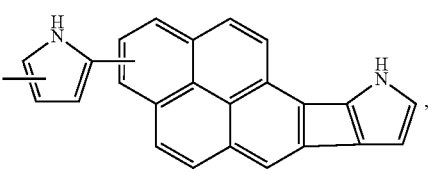

Structure PP16,

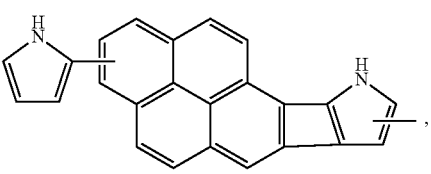

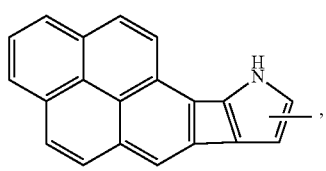

R₂ includes, but is not limited to one or more of: H, Structure PN2, Structure PY2, Structure PP7, Structure PP8, Structure PP9, Structure PP10, Structure PP11, Structure PP12, Structure PP13, Structure PP14, Structure PP15, and Structure PP16 defined as supra;

wherein, the chemical bond that is not linked to any atom on the pyrene group is a chemical bond that can be linked to any atom on each of the pyrene rings; and the chemical bond that is not linked to any atom on the pyrrole group is a chemical bond that can be linked to any atom on the pyrrole ring.

In an illustrative embodiment, the present disclosure provides a copolymer of pyrene and pyrrole, in which the copolymer includes, but is not limited to one or more of: Structure CP1, Structure CP2, Structure CP3, Structure CP4, and Structure CP5:

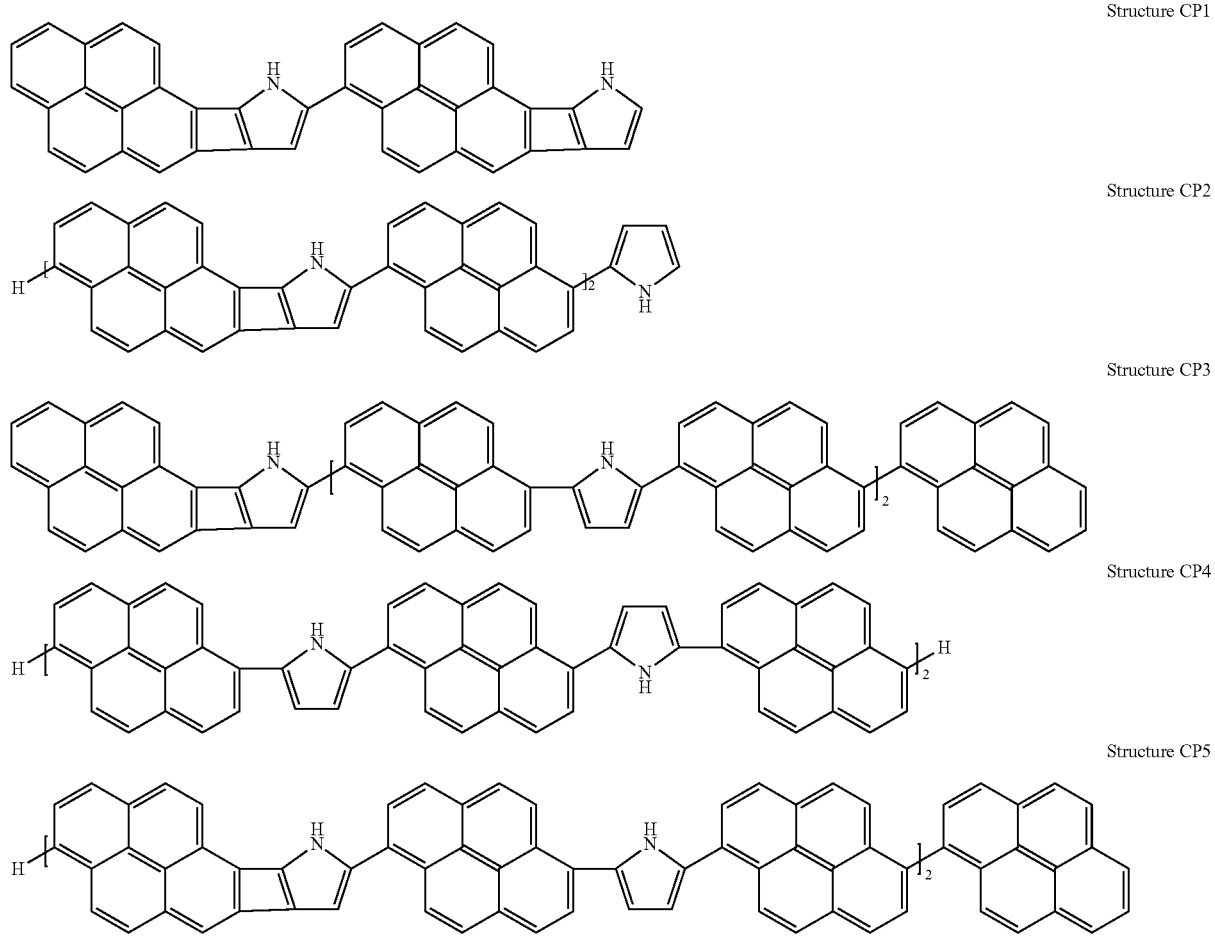

Structure CP1

Structure CP2

Structure CP3

Structure CP4

Structure CP5

In an illustrative embodiment, the copolymer of pyrene and pyrrole has a linear chain structure. In another illustrative embodiment, the copolymer of pyrene and pyrrole has a branched chain structure.

In an illustrative embodiment, the present disclosure provides a copolymer of pyrene and pyrrole, in which the copolymer has a weight average molecular weight of about 500 to 10000. The molecular weight of copolymer can be determined MALDI-TOF mass spectra (W. Schrepp, H. Pasch, "Maldi-T of Mass Spectrometry of Synthetic Polymers" (Springer Laboratory) (2003), Berlin: Springer-Verla; Nielen, Michel W. F., "Characterization of polydisperse synthetic polymers by size-exclusion chromatography/matrix-assisted laser desorption/ionization time-of-flight mass spectrometry", *Rapid Communications in Mass Spectrometry* 11: 1194 (1997).).

In another illustrative embodiment, about 5% to 95% of the copolymers by weight have a weight average molecular weight of about 500 to 10000. In another illustrative embodiment, about 10% to 90% of the copolymers by weight have a weight average molecular weight of about 500 to 10000. In another illustrative embodiment, about 20% to 80% of the copolymers by weight have a weight average molecular weight of about 500 to 10000. In another illustrative embodiment, about 30% to 70% of the copolymers by weight have a weight average molecular weight of about 500 to 10000. In another illustrative embodiment, about 40% to 60% of the copolymers by weight have a weight average molecular weight of about 500 to 10000. In another illustrative embodiment, at least 5%, at least 10%, at least 20%, at least 30%, at least 40%, at least 50%, at least 60%, at least 70%, at least 80%, or at least 90% of the Copolymers by weight have a weight average molecular weight of about 500 to 10000. In another illustrative embodiment, at least 50% of the copolymers by weight have a weight average molecular weight of about 500 to 10000, about 500 to 9000, about 500 to 8000, about 500 to 7000, about 500 to 6000, about 500 to 5000, about 500 to 4000, about 500 to 3000, or about 500 to 2000.

In an illustrative embodiment, the present disclosure provides a composition including a copolymer of pyrene and pyrrole, in which about 5% to 95% of the copolymers by weight have a weight average molecular weight of about 500 to 10000. In another illustrative embodiment, the present disclosure provides a composition including a copolymer of pyrene and pyrrole, in which about 10% to 90% of the copolymers by weight have a weight average molecular weight of about 500 to 10000. In another illustrative embodiment, the present disclosure provides a composition including a copolymer of pyrene and pyrrole, in which about 20% to 80% of the copolymers by weight have a weight average molecular weight of about 500 to 10000. In another illustrative embodiment, the present disclosure provides a composition including a copolymer of pyrene and pyrrole, in which about 30% to 70% of the copolymers by weight have a weight average molecular weight of about 500 to 10000. In another illustrative embodiment, the present disclosure provides a composition including a copolymer of pyrene and pyrrole, in which about 40% to 60% of the copolymers by weight have a weight average molecular weight of about 500 to 10000. In another illustrative embodiment, the present disclosure provides a composition including a copolymer of pyrene and pyrrole, in which at least 5%, at least 10%, at least 20%, at least 30%, at least 40%, at least 50%, at least 60%, at least 70%, at least 80%, or at least 90% of the copolymers by weight have a weight average molecular weight of about 500 to 10000. In another illustrative embodiment, the present disclosure provides a composition including a copolymer of pyrene and pyrrole, in which at least 50% of the copolymers by weight have a weight average molecular weight of about 500 to 10000, about 500 to 9000, about 500 to 8000, about 500 to 7000, about 500 to 6000, about 500 to 5000, about 500 to 4000, about 500 to 3000, or about 500 to 2000.

In an illustrative embodiment, the copolymer provided herein has a thermal decomposition temperature between about 400° C. and 800° C. in the presence of nitrogen. In another illustrative embodiment, the thermal decomposition temperature is between about 400° C. and 700° C. in the presence of nitrogen. In another illustrative embodiment, the thermal decomposition temperature is between about 400° C. and 500° C. in the presence of nitrogen. The term "thermal decomposition temperature" refers to the temperature at which the weight loss of copolymer reaches the maximum speed.

The thermal decomposition temperature can be determined by the thermogravimetric analysis (TGA) (J. Menczel, B. Prime, "Thermal Analysis of Polymers, Fundamentals and Applications," published by John Wiley & Sons, Inc., Hoboken, N.J., Chapter 3, p. 241-311 (2009)).

In an illustrative embodiment, the copolymer provided herein has an electrical conductivity of about $10^2$ to $10^{-11}$ S cm$^{-1}$, 10 to $10^{-11}$ S cm$^{-1}$, 1 to $10^{-11}$ S cm$^{-1}$, $10^{-1}$ to $10^{-11}$ S cm$^{-1}$, $10^{-2}$ to $10^{-11}$ S cm$^{-1}$, $10^{-3}$ to $10^{-11}$ S cm$^{-1}$, $10^{-4}$ to $10^{-11}$ S cm$^{-1}$, $10^2$ to $10^{-10}$ S cm$^{-1}$, $10^2$ to $10^{-9}$ S cm$^{-1}$, $10^2$ to $10^{-8}$ S cm$^{-1}$, $10^2$ to $10^{-7}$ S cm$^{-1}$, $10^2$ to $10^{-6}$ S cm$^{-1}$, $10^2$ to $10^{-5}$ S cm$^{-1}$, or $10^2$ to $10^{-4}$ S cm$^{-1}$. In another illustrative embodiment, the electrical conductivity of the copolymer is about $1.6 \times 10^{-3}$ to $10^{-11}$ S cm$^{-1}$. Electrical conductivity of the copolymer can be measured by dissolving the copolymer in a solvent to prepare a solution and measuring the electrical resistance of the solution using a multimeter at room temperature.

In an illustrative embodiment, the copolymer provided herein has a char yield at 1000° C. not lower than 70%. In another illustrative embodiment, the char yield of the copolymer at 1000° C. is not lower than 75%. In another illustrative embodiment, the char yield of the copolymer at 1000° C. is not lower than 80%. In another illustrative embodiment, the char yield of the copolymer at 1000° C. is not lower than 85%. In another illustrative embodiment, the char yield of the copolymer at 1000° C. is from 70% to 95%, from 70% to 90%, from 70% to 85%, or from 70% to 80%. To obtain the char, the copolymer is heated at 1000° C. in $N_2$ atmosphere until there is no more weight reduction in the remaining substance. The char yield is calculated as the percentage of the weight of the remaining substance to the initial weight of the copolymer.

In an illustrative embodiment, the copolymer provided herein is soluble in organic solvent. In another illustrative embodiment, the copolymer of the present disclosure that can be dissolved in the organic solvent is at least 5%, at least 10%, at least 20%, at least 30%, at least 40%, at least 50%, at least 60%, at least 70%, at least 80%, or at least 90% of the total weight of the copolymer present in the organic solvent. In another illustrative embodiment, the copolymer dissolved in the organic solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the copolymer present in the organic solvent. In another illustrative embodiment, 5%-100% of the copolymer by weight is soluble in the organic solvent. Illustrative examples of organic solvents in which the copolymer is soluble include, but are not limited to, esters such as ethyl acetate and n-butyl acetate, ketones such as acetone and methyl ethyl ketone, alcohols such as ethanol and isopropanol, ethers such as diethyl ether and dioxane, aliphatic or aromatic hydrocarbons such as toluene and cyclohexane, and any mixture thereof. In another illustrative embodiment, the copolymer is soluble in N-methylpyrrolidone (NMP), tetrahydrofuran (THF), chloroform, dimethylformamide (DMF), Acetone, and/or dimethylsulfoxide (DMSO). In another illustrative embodiment, 5%-100% of the copolymer by weight is soluble in the organic solvent including but not limited to one or more of N-methylpyrrolidone (NMP), tetrahydrofuran (THF), chloroform, dimethylformamide (DMF), and dimethylsulfoxide (DMSO).

In an illustrative embodiment, the copolymer provided herein has UV absorbance peaks at wavelengths ranging from about 250 nm to about 800 nm. In another illustrative embodiment, the copolymer has absorbance peaks at wavelengths ranging from about 250 nm to about 690 nm. In another illustrative embodiment, the copolymer has absorbance peaks at wavelengths ranging from about 250 nm to about 500 nm.

In an illustrative embodiment, the copolymer provided herein has fluorescence emission peaks at wavelengths ranging from about 400 nm to about 700 nm. In another illustrative embodiment, the copolymer has fluorescence emission peaks at wavelengths ranging from about 400 nm to about 600 nm. In another illustrative embodiment, the copolymer has fluorescence emission peaks at wavelengths ranging from about 400 nm to about 550 nm.

In an illustrative embodiment, the fluorescence emission behavior of the copolymer changes as the copolymer comes into contact with target chemicals. The fluorescence emission behavior includes but is not limited to fluorescence intensity, and fluorescence lifetime. Target chemicals are substances that can react with the copolymer and affect the fluorescence behavior of the copolymer.

In certain embodiments, the target chemicals may be organic compounds. In certain embodiments, the organic compounds may be nitroaromatic compounds. Illustrative examples of nitroaromatic compounds include, but are not limited to, trinitrotoluene (TNT), dinitrotoluene, nitrotoluene, and trinitrophenol. As the copolymer contacts target chemicals, the fluorescence emission behavior of the copolymer changes, and such change will indicate the presence and/or quantity of the target chemicals in the sample. For example, the intensity of the fluorescence emission of the copolymer can change (e.g. elevated or weakened) after contacting with a nitroaromatic compound. For another example, the color of the fluorescence emission of the copolymer can change (e.g., red shift or blue shift) after contacting with a nitroaromatic compound. For yet another example, the quantity of a nitroaromatic compound can be calculated based the intensity of the fluorescence emission of the copolymer contacted with the nitroaromatic compound.

The fluorescence emission of the copolymer can be quantified using a device that can measure the fluorescent intensity of the copolymer. In an illustrative embodiment, the copolymer contacted with a nitroaromatic compound is analyzed by a fluorospectrometer to measure the intensity of the fluorescence, and the results are compared with the fluorescence intensity of the same copolymer that is not contacted with the nitroaromatic compound to show the changes in fluorescence between the two samples.

Different characteristics of fluorescence emission may be measured to detect and quantify target chemicals. In an illustrative embodiment, the quantity of a target chemical is in linear relationship with the intensity of fluorescence emission of the copolymer contacted with the target compound, and therefore a working curve may be created to reflect such linear relationship and calculate the quantity of the target chemical.

The copolymer of the present disclosure has high thermal stability and ablation resistance. Ablation is an erosive phenomenon in which, as a material is exposed to high temperatures such as above 1200° C. in an air environment, parts of the material are weakened by thermal oxidation. Substances undergoing ablation may be removed by combustion flames with high pressure and velocity. Materials having ablation resistance can have a low erosion rate and long material lifetime even when exposed to high or extremely high temperatures. The resistance to ablation of the copolymer product may be tested by an ablation test such as without limitation oxyacetylene ablation testing. For example, in oxyacetylene ablation testing, hot combustion gases (such as oxyacetylene) can be directed along the direction perpendicular to the center of the specimen of copolymer until burn-through is achieved. The erosion rate of the copolymer can be determined by dividing the original thickness of the specimen by the time required for burn-through (ASTM Standard E 285-80, (2002), "Standard Test Method for Oxyacetylene Ablation Testing of Thermal Insulation Materials," ASTM International, West Conshohocken, Pa., www.astm.org; Najim, T. et al, "Thermal and Ablative Properties of Ipns and Composites of High Ortho Resole Resin and Difurfurylidene Acetone", Leonardo Electronic Journal of Practices and Technologies, 13:34-46 (2008)). Other methods for ablation test may also be used, for example, the copolymer product can be exposed to flames that are applied to the product at certain speeds and temperatures for a certain period of time and observe the effects of such flame on the product.

Methods of Preparation

In another aspect, the present disclosure provides a method of producing a copolymer including pyrene and pyrrole, including incubating pyrene monomers and pyrrole monomers in the presence of an oxidant and a reaction solvent.

The term "oxidant" refers to one or more substances that can gain electrons in a reduction-oxidation reaction. In an illustrative embodiment, the oxidant is a Lewis acid or a combination of more than one Lewis acid. In another illustrative embodiment, the oxidant includes, but is not limited to one or more of: $FeCl_3$, $FeBr_3$, $AlCl_3$, $AlBr_3$, $AlI_3$, $AlRCl_2$, $AlR_2Cl$, $AlR_3$, $CuCl_2$, $CuBr_2$, $MoCl_5$, $SnCl_4$, $SnBr_4$, $SnI_4$, $MgCl_2$, $MgBr_2$, $MgI_2$, $CaCl_2$, $CaBr_2$, $CaI_2$, $ZnCl_2$, $ZnBr_2$, $ZnI_2$, $BF_3$, $TiCl_4$, $TiBr_4$, $SbCl_5$ and any combination thereof. In another illustrative embodiment, the oxidant is $FeCl_3$.

The term "reaction solvent" is an organic solvent that may be used in the reaction to promote and facilitate the oxidation reaction. The reaction solvent may contain one or more organic chemical compounds in liquid form under the reaction temperature, such as but not limited to, nitroalkanes, aromatic nitro compounds, hydrocarbons, halogenated hydrocarbons, nitriles and any combination thereof. Hydrocarbons are organic compounds consisting of entirely hydrogen and carbon. Illustrative examples include, but are not limited to, hexane, benzene, and isooctane. Nitroalkanes are saturated hydrocarbon derivatives having at least one nitro group ($—NO_2$). Illustrative examples include, but are not limited to, nitromethane, nitroethane, 1-nitropropane, and 2-nitropropane. Aromatic nitro compounds are organic compounds having at least one benzene ring and at least one nitro group attached to the benzene ring. Illustrative examples include, but are not limited to, nitrobenzene, and dinitrobenzene. Halogenated hydrocarbons are hydrocarbon derivatives having at least one halogen. Illustrative examples include, but are not limited to, dichlorobenzene, bromoethane and chloroform. Nitriles are organic compounds having at least one $—C\equiv N$ functional group. Illustrative examples include, but are not limited to, acetonitrile, propionitrile and butyronitrile. In another illustrative embodiment, the reaction solvent includes, but is not limited to one or more of: nitromethane ($CH_3NO_2$), nitroethane($CH_3CH_2NO_2$), nitrobenzene, dinitrobenzene, hexane, benenze, pentane, isooctane, cyclohexane, dichloromethane, chloroform, dichloroethane, dichlorobenzene, bromoethane, dibromoethane, bromobenzene, dibromobenzene, bromopentane, carbon tetrachloride, acetonitrile, propionitrile, butyronitrile, and any combination thereof. In an illustrative embodiment, the reaction solvent is nitromethane.

The reaction solvent should be able to at least partially (or completely) dissolve pyrene, and/or pyrrole, and/or the oxidant. In certain embodiments, the reaction solvent can at least partially (or completely) dissolve the pyrene monomer. In an illustrative embodiment, the pyrene monomer dissolved in the reaction solvent is at least 5%, at least 10%, at least 20%, at least 30%, at least 40%, at least 50%, at least 60%, at least 70%, at least 80%, or at least 90% of the total weight of the pyrene monomer present in the reaction solvent. In another illustrative embodiment, the pyrene monomer dissolved in the reaction solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the pyrene monomer present in the reaction solvent.

In certain embodiments, the reaction solvent can at least partially (or completely) dissolve the pyrrole monomer. In an illustrative embodiment, the pyrrole monomer dissolved in the reaction solvent is at least 5%, at least 10%, at least 20%, at least 30%, at least 40%, at least 50%, at least 60%, at least 70%, at least 80%, or at least 90% of the total weight of the pyrrole monomer present in the reaction solvent. In another illustrative embodiment, the pyrrole monomer dissolved in the reaction solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the pyrrole monomer present in the reaction solvent.

In certain embodiments, the reaction solvent can at least partially (or completely) dissolve both the pyrene monomer and the pyrrole monomer. In an illustrative embodiment, the pyrene and pyrrole monomers dissolved in the reaction solvent are at least 5%, at least 10%, at least 20%, at least 30%, at least 40%, at least 50%, at least 60%, at least 70%, at least 80%, or at least 90% of the total weight of the pyrene and pyrrole monomers present in the reaction solvent. In another illustrative embodiment, the pyrene and pyrrole monomers dissolved in the reaction solvent are between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the pyrene and pyrrole monomers present in the reaction solvent.

In certain embodiments, the reaction solvent can at least partially (or completely) dissolve the oxidant. In an illustrative embodiment, the oxidant dissolved in the reaction solvent is at least 5%, at least 10%, at least 20%, at least 30%, at least 40%, at least 50%, at least 60%, at least 70%, at least 80%, or at least 90% of the total weight of the oxidant present in the reaction solvent. In an illustrative embodiment, the oxidant dissolved in the reaction solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the oxidant present in the reaction solvent.

In certain embodiments, the reaction solvent consists of an organic solvent that at least partially (or completely) dissolves the pyrene monomer, pyrrole monomer and the oxidant. Illustrative examples of such reaction solvent are nitroalkanes such as nitromethane and nitroethane, hydrocarbons, halogenated hydrocarbons, and nitriles. In an illustrative embodiment, the pyrene monomer, pyrrole monomer and oxidant dissolved in the reaction solvent is at least 5%, at least 10%, at least 20%, at least 30%, at least 40%, at least 50%, at least 60%, at least 70%, at least 80%, or at least 90% of the total weight of those substances present in the reaction solvent. In an illustrative embodiment, the pyrene monomer, pyrrole monomer and oxidant dissolved in the reaction solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of those substances present in the reaction solvent.

In certain embodiments, the reaction solvent may contain a mixture of two or more organic solvents that at least partially (or completely) dissolve all of the pyrene monomer, pyrrole monomer and the oxidant. Illustrative examples of such mixture of organic solvents include, halogenated hydrocarbon/nitroalkane such as dichloromethane/nitromethane, dichloroethane/nitromethane, dichloromethane/nitroethane, dichloroethane/nitroethane; halogenated hydrocarbon/aromatic nitro compound such as dichloromethane/nitrobenzene, and dichloroethane/nitrobenzene; hydrocarbon/nitroalkane such as benzene/nitromethane, and benzene/nitroethane; hydrocarbon/aromatic nitro compound such as n-hexane/nitrobenzene, and benzene/nitrobenzene; and nitriles/nitroalkane such as acetonitrile/nitromethane.

In certain embodiments, the reaction solvent may contain a first organic solvent that can at least partially (or completely) dissolve the pyrene monomer, a second organic solvent that can at least partially (or completely) dissolve the pyrrole monomer, and/or a third organic solvent that can at least partially (or completely) dissolve the oxidant, and the first, second and/or third organic solvent can be mixed to form a reaction solvent. Illustrative examples include, dichloromethane/nitromethane, dichloroethane/nitromethane, and benzene/nitromethane. The first, second and third organic solvent may or may not be mutually miscible. The first, second and third organic solvent may each consist of one or more organic chemical compounds.

In certain embodiments, the reaction solvent may contain a first organic solvent that can at least partially (or completely) dissolve two substances including but not limited to one or more of pyrene, pyrrole and the oxidant, and/or a second organic solvent that can at least partially (or completely) dissolve the remaining substance that does not dissolve in the first organic solvent, and the first and second organic solvents may be mixed to form a reaction solvent. The first and second organic solvent may or may not be mutually miscible. The first and second organic solvent may each consist of one or more organic chemical compounds.

In an illustrative embodiment, the present disclosure provides a method of producing copolymer, including polymerizing pyrene monomers and pyrrole monomers in the presence of an oxidant and a reaction solvent, in which the molar ratio of the oxidant to the total amount of monomers is in the range from 1:1 to 9:1. In another illustrative embodiment, the molar ratio of the oxidant to the total amount of monomers is in the range from 1:1 to 8:1. In another illustrative embodiment, the molar ratio of the oxidant to the total amount of monomers is in the range from 1:1 to 7:1. In another illustrative embodiment, the molar ratio of the oxidant to the total amount of monomers is in the range from 2:1 to 7:1. In another illustrative embodiment, the molar ratio of the oxidant to the total amount of monomers is in the range from 3:1 to 7:1. In another illustrative embodiment, the molar ratio of the oxidant to the total amount of monomers is in the range from 3:1 to 6:1. In another illustrative embodiment, the molar ratio of the oxidant to the total amount of monomers is in the range from 4:1 to 6:1. In another illustrative embodiment, the molar ratio of the oxidant to the total amount of monomers is in the range from 5:1 to 6:1.

In an illustrative embodiment, the molar ratio of pyrene to pyrrole in the copolymer is in the range from 95:5 to 30:70. In another illustrative embodiment, the molar ratio of pyrene to pyrrole in the copolymer is in the range from 90:10 to 40:60. In another illustrative embodiment, the molar ratio of pyrene to pyrrole in the copolymer is in the range from 80:20 to 40:60. In another illustrative embodiment, the molar ratio of pyrene to pyrrole in the copolymer is in the range from 70:30 to 40:60. In another illustrative embodiment, the molar ratio of pyrene to pyrrole in the copolymer is in the range from 60:40 to 50:50. In an illustrative embodiment, the molar ratio of pyrene to pyrrole in the copolymer is 95:5. In another illustrative embodiment, the molar ratio of pyrene to pyrrole in the copolymer is 80:20. In another illustrative embodiment, the molar ratio of pyrene to pyrrole in the copolymer is 70:30. In an illustrative embodiment, the molar ratio of pyrene to pyrrole in the copolymer is 50:50.

In an illustrative embodiment, the present disclosure provides a method of producing the copolymer, including polymerizing pyrene monomers and pyrrole monomers in the presence of an oxidant and a reaction solvent, in which the polymerization is conducted at the reaction temperature ranging from 10° C. to 100° C. In another illustrative embodiment, the reaction temperature is from 20° C. to 80° C. In another illustrative embodiment, the reaction temperature is from 30° C. to 70° C. In another illustrative embodiment, the reaction temperature is from 40° C. to 70° C. In another illustrative embodiment, the reaction temperature is from 40° C. to 65° C. In another illustrative embodiment, the reaction temperature is from 40° C. to 60° C. In another illustrative embodiment, the reaction temperature is from 40° C. to 55° C. In another illustrative embodiment, the reaction temperature is from 45° C. to 55° C. In another illustrative embodiment, the reaction temperature is at or above about 45° C., 46° C., 47° C., 48° C., 49° C., or 50° C., but not higher than about 100° C. The reaction temperature can be monitored and/or measured using a thermometer appropriately submerged in the reaction mixture or in the bath surrounding the reaction mixture.

In an illustrative embodiment, the present disclosure provides a method of producing the copolymer, including polymerizing pyrene monomers and pyrrole monomers in the presence of an oxidant and a reaction solvent, in which the polymerization is conducted for a reaction time of 1 to 48 hours. In another illustrative embodiment, the reaction time is 10 to 30 hours. In another illustrative embodiment, the reaction time is 18 to 24 hours. In another illustrative embodiment, the reaction time is for up to 4 hours, 6 hours, 8 hours, 10 hours, 12 hours, 14 hours, 16 hours, 18 hours, 20 hours, 22 hours or 24 hours. In another illustrative embodiment, the reaction time is at least 10 hours, 15 hours, 16 hours, 18 hours, or 20 hours.

Methods of Use

The copolymer provided herein may be used for detection of biomarkers. Biomarkers may include, but are not limited to, tissue, cells, proteins, peptides, nucleic acids, nucleotides, lipids, compounds, metabolites, carbohydrates, saccharides, lipoproteins, glycoproteins, biological complexes such as protein-DNA complexes (e.g. chromosomes), protein-lipid complexes, and protein-protein complexes. The biomarkers may be detected by the copolymer using methods known in the art (see, for example, U.S. Pat. No. 5,661,040; T. A. Skotheim et al, "Conjugated polymers: processing and applications," Third Edition, published by CRC Press, Chapter 13, p 13-20 (2006); S. Kumaraswamy et al, "Fluorescent-conjugated polymer superquenching facilitates highly sensitive detection of proteases," Proceedings of National Academy of Sciences, 101(20): 7511-7515 (2004); H. Xu et al, "Magnetically assisted DNA assays: high selectivity using conjugated polymers for amplified fluorescent transduction," Nucleic Acids Research, 33(9):e83 (2005)).

In another illustrative embodiment, the copolymers provided herein are used for detecting or identifying organic chemicals. In another illustrative embodiment, the organic chemicals are nitroaromatic compounds. Illustrative examples of nitroaromatic compounds are trinitrotoluene (TNT), dinitrotoluene, and nitrotoluene. The nitroaromatic compounds may be detected by the copolymer using methods known in the art (see, for example, J. W. Gardner et al, "Electronic noses & sensors for the detection of explosives," published by Springer, Chapter 4, p 53-130 (2004); M. La Grone et al, "Landmine detection by chemical signature: Detection of vapors of nitroaromatic compounds by fluorescence quenching of novel polymer materials," Proceedings of SPIE, the International Society for Optical Engineering, 3710 (1): 409-420 (1999); U.S. Pat. No. 5,306,642). In an illustrative embodiment, the copolymer may be sprayed or painted on to a surface, and can be applied to such simple materials as tape or cloth swabs, or applied to much more complex devices such as electronic sensors or electronic noses (see, for example, U.S. Pat. No. 7,208,122).

In another illustrative embodiment, the copolymers provided herein may be used for manufacturing fluorescent sensors. The sensor may include one or more copolymers, a source of energy applicable to the copolymers to cause fluorescence emission and optionally a device for detecting the emission. The sensor may be made by a person skilled in the art using suitable methods (see, for example, S. J. Toal et al, "Polymer sensors for nitroaromatic explosives detection," Journal of Materials Chemistry, 16: 2871-2883 (2006); U.S. Pat. No. 5,237,631; U.S. Pat. No. 5,157,261, U.S. Pat. No. 7,416,703).

In another illustrative embodiment the copolymers provided herein may be used for manufacturing light-emitting diodes (LEDs). The LEDs work through a similar process as fluorescent lighting. Generally, a semiconductor part in a chip produces light in the blue part of the spectrum, which strikes a fluorescent material deposited on the chip; upon irradiation, the fluorescent material emits light in the green to red part of the spectrum. The combination of the blue light that goes through the fluorescent material and the light emitted by the fluorescent material produces a net emission of white light. A person skilled in the art can readily make LEDs using the copolymers described herein (see, for example, H. Sirringhaus et al, "Integrated Optoelectronic Devices Based on Conjugated Polymers," Science, 280(5370): 1741-1744 (1998)).

In another illustrative embodiment, the copolymers provided herein may be used for manufacturing pressure sensitive materials. The copolymers may be manufactured into labels, tapes, and protective films by people skilled in the art (see, for example, I. Benedek, "Developments in pressure-sensitive products," Edition 2, published by CRC press, Chapter 2, 6-49 (2005)).

In another illustrative embodiment, the copolymers provided herein may be used for manufacturing batteries, using methods known in the art (see, for example, D. Fauteux et al, "Lithium polymer electrolyte rechargeable battery," Electrochimica Acta, 40(13-14): 2185-2190 (1995); C. J. Brabec et al, "Plastic Solar Cells," Advanced Functional Materials, 11(1): 15-26 (2001); U.S. Pat. No. 5,882,621).

In another illustrative embodiment, the copolymers provided herein may be used for manufacturing thermal resistant materials (see, for example, European patent EP0374593; U.S. Pat. No. 5,256,462; U.S. Pat. No. 6,503,427).

In another illustrative embodiment, the copolymer provided herein may be used for making thermostable materials or ablation resistant materials. The thermal stable materials or ablation resistant materials may be made by any method known to a person skilled in the art. In brief, in an illustrative embodiment, the materials may be made by producing the copolymer using the methods described herein, isolating and purifying the resulting copolymer, making the copolymer into the desired shape and structure such as powder, film, foam, sheet, block, solution and paste. The ablation resistant copolymer of the present disclosure may be used as protective surface materials for any surface, such as but not limited to, machinery, construction, buildings and steel structures, etc, that may require resistance to fire and extremely high heat.

In another illustrative embodiment, the copolymers provided herein may be used for manufacturing precursors of carbon materials such as carbon fibers and composite carbon materials such as carbon fiber-reinforced carbon composite materials (see, for example, P. Morgan, "Carbon fibers and their composites, Volume 27 of Materials Engineering Series," published by CRC press, Chapter 4, p 121-175 (2005); A. B. Strong et al, "Fundamentals of composites manufacturing: materials, methods and applications," Edition 2, published by SME, p 186-188 (2007)). In an illustrative embodiment, the copolymer can be drawn into long strands of fibers and then heated to a very high temperature in the absence of oxygen until the fibers are carbonized; the produced carbon fibers can be used to make products such as racing car bodies, golf club shafts, bicycle frames, fishing rods, automobile springs, sailboat masts, and many other products where light weight and high strength are desirable. In another illustrative embodiment, the copolymer described herein may also be used to make nanotubes that can make high-strength fibers, submicroscopic test tubes, and new semiconductor materials for integrated circuits (for review, please see: P. Morgan, Carbon fibers and their composites, published by CRC Press (2005); B. George et al, *Materials Handbook* Published by McGraw-Hill, 1997; Ebbesen, T. W. "Carbon Nanotubes." *Physics Today,* 26-32 (1996 June)). In another illustrative embodiment, the copolymer can be used to make carbon fiber-reinforced carbon composite materials (for reviews on production method, please see: P. Morgan, Carbon fibers and their composites, published by CRC Press (2005)). The obtained carbon fiber-reinforced carbon composite materials can be used in automotive applications and railway applications, such as components of the brake systems on high performance road cars or on high-speed trains (e.g. brake disc and brake pads).

The copolymer described herein has high electrical conductivity and thus can be used to conduct electricity. In an illustrative embodiment, the copolymer or the doped copolymer can be used as an additive in materials that have no or poor conductivity of electricity so as to improve the conductivity of the materials. In another illustrative embodiment, the copolymer can be used as an additive in materials that tend to accumulate static electricity so as to prevent accumulation of static electricity in such materials. In another illustrative embodiment, the copolymer may be used in a packaging material to prevent accumulation of static electricity in the material.

In another aspect, the present disclosure provides pyrene/pyrrole copolymer useful for making detecting agents for biomarkers. In another aspect, the present disclosure provides detecting agents for detection of biomarkers including the pyrene/pyrrole copolymer of the present disclosure.

In another aspect, the present disclosure provides pyrene/pyrrole copolymer useful for detecting or identifying organic chemicals. In another aspect, the present disclosure provides detecting agents for detection of organic chemicals including the pyrene/pyrrole copolymer of the present disclosure.

In another aspect, the present disclosure provides pyrene/pyrrole copolymer useful for manufacturing fluorescent sensors. In another aspect, the present disclosure provides fluorescent sensors including the pyrene/pyrrole copolymer of the present disclosure.

In another aspect, the present disclosure provides pyrene/pyrrole copolymer useful for manufacturing LEDs. In another aspect, the present disclosure provides LEDs including the pyrene/pyrrole copolymer of the present disclosure.

In another aspect, the present disclosure provides pyrene/pyrrole copolymer useful for manufacturing pressure sensitive materials. In another aspect, the present disclosure provides pressure sensitive materials including the pyrene/pyrrole copolymer of the present disclosure.

In another aspect, the present disclosure provides pyrene/pyrrole copolymer useful for manufacturing batteries. In another aspect, the present disclosure provides batteries including the pyrene/pyrrole copolymer of the present disclosure.

In another aspect, the present disclosure provides pyrene/pyrrole copolymer useful for making thermal resistant materials or ablation resistant materials. In another aspect, the present disclosure provides thermal resistant materials including the pyrene/pyrrole copolymer of the present disclosure. In another aspect, the present disclosure provides ablation resistant materials including the pyrene/pyrrole copolymer of the present disclosure.

In another aspect, the present disclosure provides pyrene/pyrrole copolymer useful for making carbon precursors for the preparation of carbon fibers and carbon fiber-reinforced carbon composite materials. In another aspect, the present disclosure provides carbon precursors for the preparation of carbon fibers and carbon fiber-reinforced carbon composite including the pyrene/pyrrole copolymer of the present disclosure.

In another aspect, the present disclosure provides pyrene/pyrrole copolymer useful for making electrically conductive materials. In another aspect, the present disclosure provides an electrically conductive material including the pyrene/pyrrole copolymer of the present disclosure.

In another aspect, the present disclosure provides pyrene/pyrrole copolymer useful for making anti-static electricity materials. In another aspect, the present disclosure provides an anti-static electricity material including the pyrene/pyrrole copolymer of the present disclosure.

EXAMPLES

The following Examples are set forth to aid in the understanding of the present disclosure, and should not be construed to limit in any way the scope of the invention as defined in the claims which follow thereafter.

Example 1

Copolymerization of Pyrene and Pyrrole

Pyrene monomers and pyrrole monomers are copolymerized by chemical oxidation method using $FeCl_3$ as the oxidant in the presence of nitromethane. A series of copolymerization reactions are carried out to obtain copolymers containing different molar ratios of pyrene to pyrrole. The copolymerization reactions are performed under the same conditions, except that different molar ratios of pyrene monomers to pyrrole monomers are used: 95/5, 90/10, 80/20, 70/30, and 50/50 (see Table 1). The obtained products are named in accordance with the respective molar ratios of pyrene monomers to pyrrole monomers used in the copolymerization reaction, i.e., the products are named as copolymer 95/5, copolymer 90/10, copolymer 80/20, copolymer 70/30, and copolymer 50/50.

The copolymerization procedures are described below. Pyrene monomers are added into 50 ml nitromethane, followed by ultrasonic treatment and stirred until complete dissolution of pyrene. Pyrrole monomers are added into the pyrene solution to make a mixed monomer solution. 8.11 g (50 mmol) anhydrous ferric chloride is dissolved in 50 ml nitromethane to prepare the oxidant solution. The mixed monomer solution and the oxidant solution are pre-heated in 50° C. water bath for 30 minutes. Then the oxidant solution is added into the mixed monomer solution drop by drop at a controlled rate so that the addition of the oxidant solution is finished in about 15 minutes. The reaction mixture is stirred for 20 hours, followed by centrifugation to obtain a crude solid product.

The crude product is washed with ethanol followed by centrifugation. The ethanol wash-centrifugation cycle is repeated for 5 times. The product is then washed with water followed by centrifugation. The water wash-centrifugation cycle is repeated for 10 times. After that, the product is washed with ethanol repeatedly until the supernatant is color free. The product is then soaked in hydrochloric acid and washed for several times until no $Fe^{2+}$ or $Fe^{3+}$ can be detected in the elutant using potassium ferricyanide and potassium ferrocyanide. Finally, the product is treated with 0.5 M ammonia for 48 hours, and then washed with deionized water until pH of the eluant is neutral. The product is dried in an oven for 3 days.

The obtained final products for the series of copolymerization reactions are solid powders with different colors. The difference in color may be due to the different molar ratios of pyrene to pyrrole in the obtained copolymer products.

The copolymer products are weighed and the production yield is calculated for each reaction using the following equation (1):

$$Y\% = \frac{W_0}{W_1 + W_2} \times 100\%, \quad (1)$$

in which $W_1$ is the weight of pyrene monomers added to the reaction, $W_2$ is the weight of pyrrole monomers added to the reaction, and $W_0$ is the weight of the obtained final copolymer product.

TABLE 1

| Molar ratio of pyrene to pyrrole | Weight of Pyrene/Pyrrole (g) | Weight of obtained copolymer (g) | Production Yield |
|---|---|---|---|
| 95/5 | 1.921/0.034 | 1.529 | 78.2% |
| 90/10 | 1.820/0.067 | 1.440 | 76.3% |
| 80/20 | 1.618/0.134 | 1.405 | 80.1% |
| 70/30 | 1.416/0.201 | 1.334 | 82.5% |
| 50/50 | 1.011/0.335 | 1.155 | 85.8% |

Example 2

Conductivity Analysis and Temperature Measurement During the Pyrene/Pyrrole Copolymerization Reaction To investigate the initiation and progression of the copolymerization reaction, the open circuit potential and the polymerization temperature of the reaction mixture are monitored during the copolymerization. Pyrene and pyrrole are reacted at different molar ratios using anhydrous ferric chloride as the oxidant in the presence of nitromethane. The molar ratios of pyrene to pyrrole (Pyre/Pyrr) added to the reaction are 90:10, 70:30, and 30:70, respectively. The molar ratio of oxidant to the total amount of the monomers for each reaction is 5:1. The reaction is conducted at 50° C. for 30 hours.

The open circuit potential (OCP) during the copolymerization process is measured using a saturated calomel electrode (SCE) as a reference electrode and a Pt electrode as a working electrode by pH meter. The results are shown in FIG. 1. As shown in FIG. 1, the open circuit potentials of the mixed monomer solutions are below 200 mV before the copolymerization reaction. As the oxidant solution is added to the reaction system, the OCP of the reaction system rises rapidly and reaches a maximum at the dropping end-point and then decreases very slowly, indicating that the oxidant is gradually consumed. This is consistent with the fact that HCl is released during the reaction and $Fe^{2+}$ is detected in the resulting polymers, indicating that the monomers are oxidized and dehydrogenated to perform a copolymerization between pyrene and pyrrole monomers.

The ratio of pyrene to pyrrole in the reaction system can affect the open circuit potential of the system. As shown in FIG. 1, before polymerization, the mixed monomer solution having a higher ratio of pyrene to pyrrole shows a lower initial open circuit potential; during the reaction, the reaction system with a higher ratio of pyrene to pyrrole has a faster polymerization rate and a faster decrease rate in the open circuit potential.

Figure 2:
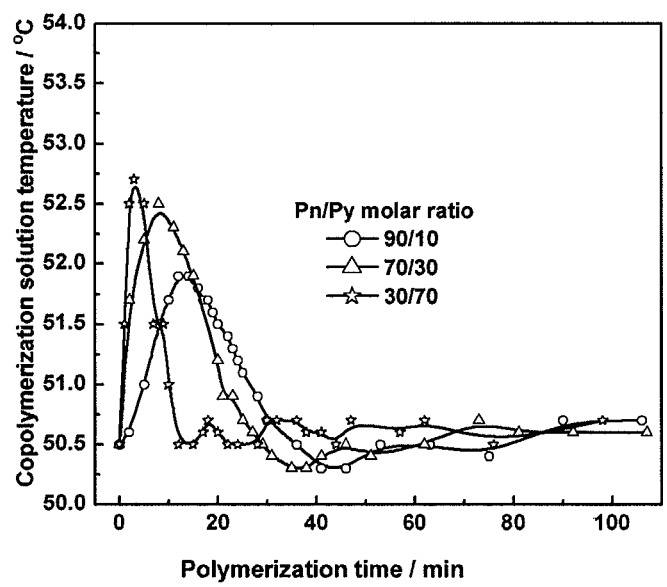
FIG. 2 shows the changes of temperature in reaction systems for polymerization of pyrene and pyrrole at different molar ratios of 90/10, 70/30, and 30/70.

The temperature of the reaction mixture is also monitored during the polymerization reaction using precise thermometer. The results are shown in FIG. 2. As the oxidant is added into the reaction mixture, the temperature of the mixture rises quickly until it reaches a peak, and then decreases to the incubation temperature. The rise in temperature indicates that the polymerization reaction releases heat. The reaction with a higher ratio of pyrene to pyrrole has a higher reaction rate, and a bigger change in temperature (more than 2° C.). This is consistent with the results from the open circuit potential measurement.

Example 3

Conductivity Analysis of the Copolymers

Figure 3:
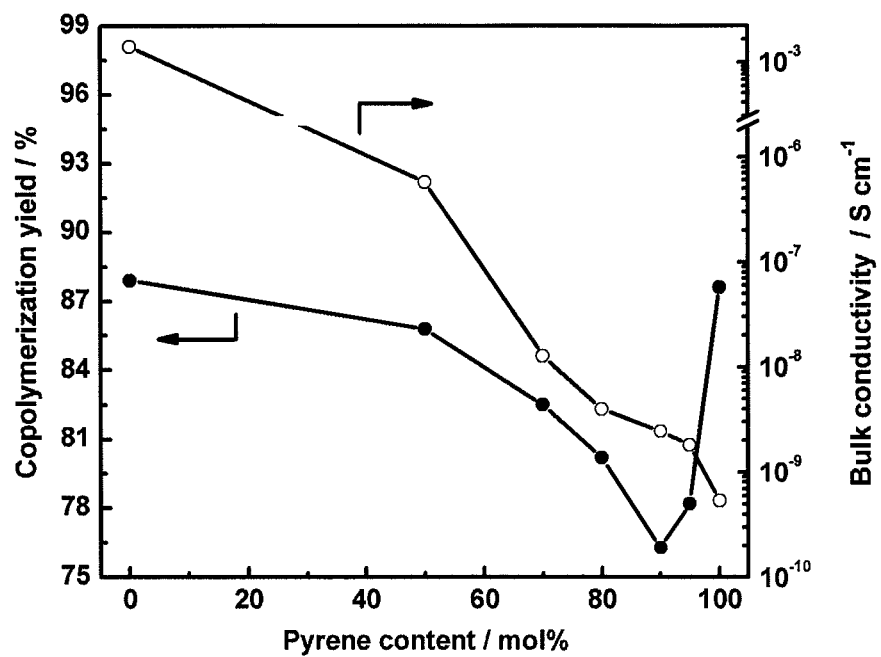
FIG. 3 shows the synthetic yield and bulk electrical conductivity of the copolymers containing different molar ratios of pyrene to pyrrole.

The relationship between the molar ratio of pyrene to pyrrole and the conductivity of the copolymer and the reaction yield are investigated. Electrical conductivity of the resulting copolymers from Example 1 are analyzed. Electrical resistance is measured for the 5 copolymers (i.e. copolymer 95/5, copolymer 90/10, copolymer 80/20, copolymer 70/30, and copolymer 50/50) and homopolymer of pyrene (polymer 100/0) and homopolymer of pyrrole (polymer 0/100), respectively. The electrical conductivity of pressed copolymer pellets with thickness of ca. 0.05 cm and a constant efficient area of 0.785 $cm^2$ was examined by a two-disk method at room temperature with a UT 70A multimeter made in China. The electrical conductivity is calculated using the following equation (2):

$$\sigma = \frac{d}{R \cdot S} \quad (2)$$

in which, σ is electrical conductivity (S/cm), d is the thickness of the polymer layer (cm), R is the measured electrical resistance of the polymer layer (Ω); S is the contact area between the polymer layer and the two copper electrodes ($cm^2$). S is assumed to be equal to the surface area of the copper electrodes, which is about 0.785 $cm^2$. The conductivity analysis results are shown in FIG. 3. As the molar amount of pyrrole in the reaction increases, the electrical conductivity of the resulting copolymer increases, suggesting that the copolymer chain length is extended and the degree of planar conjugation is increased.

The reaction yield is considered as the conversion rate of the pyrene monomers. Whether the copolymerization occurs or not, therefore, can be judged by the yield. It is assumed that the conversion of pyrrole monomers during copolymerization equals to its conversion rate during homopolymerization under the same conditions, which is 87.9%. To calculate the conversion rate of pyrene in the copolymerization, the amount of pyrrole monomers in the copolymer is first calculated by multiplying the amount of total pyrrole monomers added to the reaction with 87.9%, then the amount of pyrrole is subtracted from the total amount of the copolymer to obtain the amount of pyrene in the copolymer. The conversion of pyrene is calculated by dividing the amount of pyrene in the copolymer by the amount of total pyrene monomers added to the reaction. The calculation results are shown in Table 2.

TABLE 2

Yield of copolymers in different reactions

| Molar ratio of pyrene to pyrrole | Weight of Pyrene/ Pyrrole (g) | Weight of obtained copolymer (g) | Calculated amount of pyrrole in the copolymer (g) | Calculated amount of pyrene in the copolymer (g) | Conversion rate of Pyrene (%) |
|---|---|---|---|---|---|
| 95/5 | 1.921/0.034 | 1.529 | 0.030 | 1.499 | 78.0 |
| 90/10 | 1.820/0.067 | 1.440 | 0.059 | 1.381 | 75.9 |
| 80/20 | 1.618/0.134 | 1.405 | 0.118 | 1.287 | 79.5 |
| 70/30 | 1.416/0.201 | 1.334 | 0.177 | 1.157 | 81.7 |
| 50/50 | 1.011/0.335 | 1.155 | 0.294 | 0.861 | 85.2 |

The conversion of pyrene in all the tested copolymers are quite high (>75%), although they are less than that of the pyrene homopolymer, which is about 85%. FIG. 3 shows that, as pyrrole content increases, the conversion of pyrene decreases at first but increases later. The increase in pyrene conversion indicates that pyrrole monomers can promote copolymerization. When pyrrole content is low (pyrene/pyrrole=95/5), the copolymerization acts more like the homopolymerization of pyrene, and therefore the conversion of pyrene is quite high.

The non-linear change of conductivity of the copolymers and the conversion demonstrates that certain interactions exist between the two monomers, and therefore the resulting product are copolymers of the two monomers instead of their respective homopolymers.

Example 4

Characterization of Pyrene/Pyrrole Copolymers by Infra-Red Spectroscopy

Figure 4:
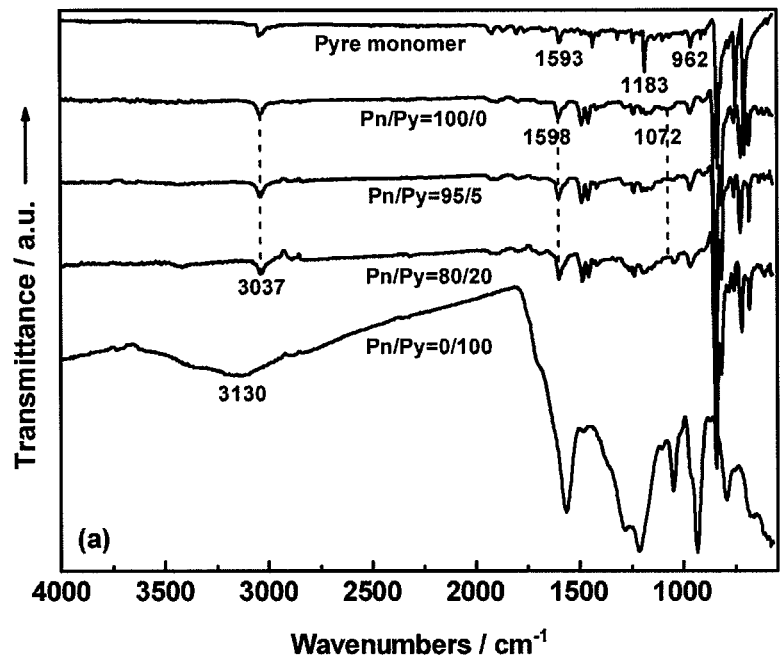
FIG. 4 shows the FT-IR spectra (a) and regional magnified spectra (b) of pyrene monomers, pyrene homopolymers, pyrrole homopolymers, and copolymers of different molar ratios of pyrene to pyrrole.
Figure 4:
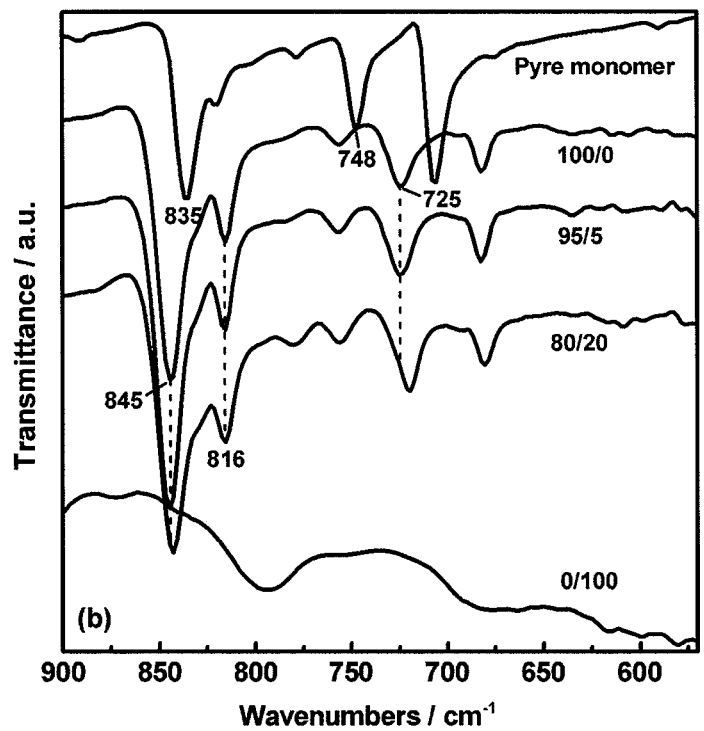

To elucidate the structure of the obtained copolymer of pyrene and pyrrole, Fourier transform infra-red (FT-IR) spectroscopy analysis is carried out to compare the pyrene monomers, pyrene homopolymers, pyrrole homopolymers and copolymers containing different molar ratios of pyrene to pyrrole. Attenuated total reflection method (ATR) is used in the FT-IR analysis to exclude the interference from water in the sample as absorbed during KBr pellets preparation, in which a few samples of the copolymer is well-blended with KBr powder and then pressed into pellets. The results are shown in FIG. 4a and FIG. 4b.

The spectra of pyrrole homopolymer show characteristic peaks of pyrrole in 3130 $cm^{-1}$, which correspond to stretching and vibration peak of C—H. The spectra data of pyrrole homopolymer also show characteristic peaks of pyrrole in 900-1600 $cm^{-1}$ as reported by others.

When compared with the spectra of pyrene monomers, the spectra data of pyrene homopolymer show a peak at 748 $cm^{-1}$, which corresponds to three adjacent C—H and is significantly weakened and shifts toward longer wavelength. The peak at 816 $cm^{-1}$, which corresponds to the two adjacent C—H bond in pyrene ring, is strengthened in the spectra of polypyrene. These data demonstrate that the pyrene units are linked through α-α coupling, and the whole molecule tends to be linear.

The spectra data of the copolymers is not simple addition of spectra data of the two homopolymers, because red shift is observed for peaks at 1598, 1072, 845, and 725 $cm^{-1}$ in the copolymer spectra as the pyrrole content increases. These results indicate that covalent bonds are formed between pyrene and pyrrole units, and the peaks shift because the molecular structure of the copolymer changes as the molar ratio of the two monomers in the copolymer changes.

Example 5

Characterization of Pyrene/Pyrrole Copolymers by X Ray Diffraction

Figure 5:
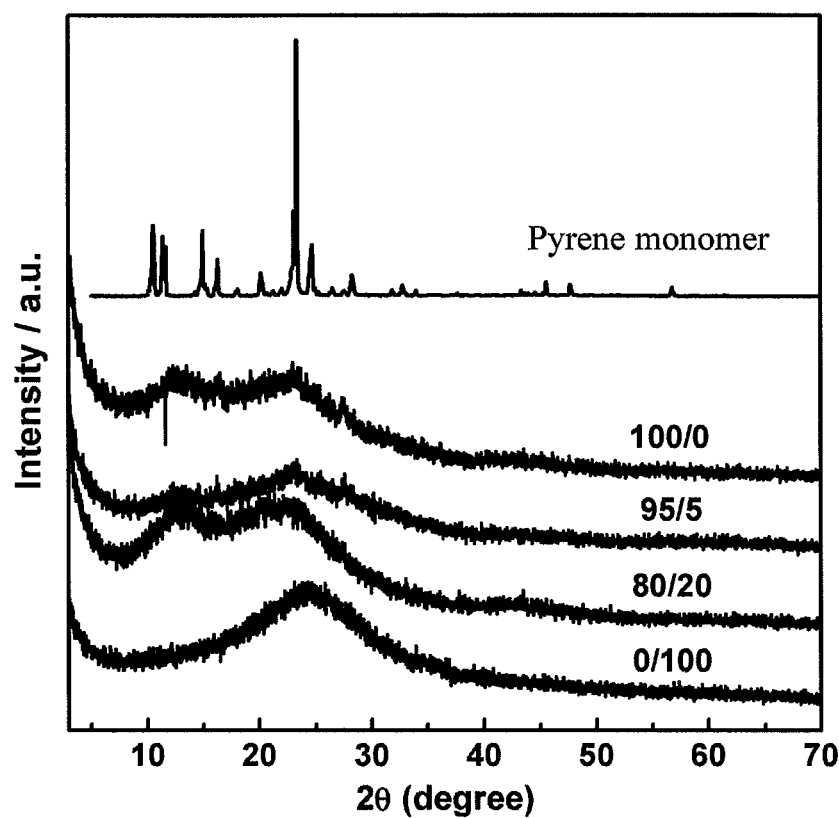
FIG. 5 shows the X-ray diffraction patterns for pyrene monomers, pyrene homopolymers, pyrrole homopolymers, and copolymers of different molar ratios of pyrene to pyrrole.

The obtained copolymers containing different molar ratios of pyrene to pyrrole are analyzed by wide angle X ray diffraction method, which was carried out on a D/max 2550 spectrograph with a copper target at a step-length of 10° $min^{-1}$, to decipher the structures of the copolymer products. The pyrene monomer, pyrene homopolymer, and pyrrole homopolymer are also analyzed. The results are shown in FIG. 5.

The spectra of pyrene monomer shows sharp and narrow diffraction peaks, which are typical of crystalline, indicating that pyrene monomers form a good crystalline structure. The polymers generally display diffused broad peaks, which are typical of an amorphous structure with short range disorder, indicating that monomers are polymerized to form amorphous polymers. The pyrene homopolymer shows two relatively sharp peaks at 2θ=12.5° and 23.5°, overlapping with the broad peaks, which indicates that the polymer is partially crystalline. The copolymer 95/5 shows a significantly reduced peak at 12.5° because a small amount of pyrrole promotes copolymerization which destroys the crystalline properties of homopolymer of pyrene. The copolymer 80/20 shows stronger diffraction peaks but the peaks are relatively smooth. This suggests that, as the pyrrole content increases, the conjugation planarity in the copolymer chain is improved, and those planar segments tend to stack and form an orderly structure. Therefore, the X ray diffraction results indicate that the copolymerization reaction not only affects the structure of polymer chains, but also lead to changes in the formation of crystalline structures, which prove again the copolymerization of pyrene and pyrrole.

Example 6

Characterization of Pyrene/Pyrrole Copolymers by UV-Visible Spectroscopy

The copolymers of pyrene and pyrrole obtained in Example 1 can be partially dissolved in tetrahydrofuran (THF) and N-methylpyrrolidone (NMP), and the soluble portion which has relatively lower molecular weight is about 30-40% of the total copolymers. Solutions of the copolymers are analyzed using UV-Visible (UV-Vis) spectroscopy to study the electronic transition properties of the copolymers. The UV-Vis results using NMP solution of copolymers are shown in FIG. 6.

Figure 6:
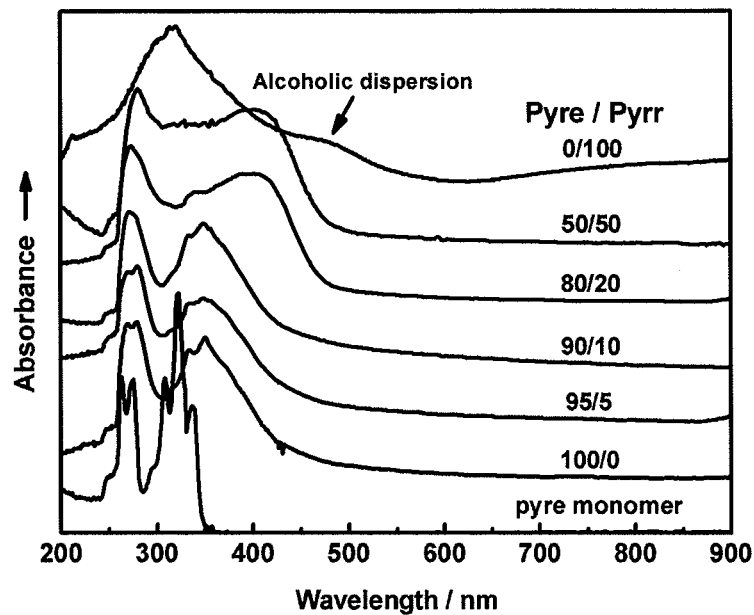
FIG. 6 shows the UV-Vis spectra of pyrene monomers, pyrene homopolymers, pyrrole homopolymers, and copolymers of different molar ratios of pyrene to pyrrole, all of which dissolved in NMP.

In FIG. 6, the pyrene monomer solution shows sharp absorption peaks between 250-350 nm, which are caused by single electron transition in the pyrene ring and are characteristic absorption band of pyrene. The number of absorption peaks in the polymer solutions is significantly reduced, and the peaks are widened with shift toward longer wave lengths, indicating that the monomers are actually polymerized. As the pyrrole content in the copolymer increases, the absorption peaks of the copolymers in the longer wave length region are further widened, and form a new absorption band, which suggests that the conjugated chain length in the soluble copolymers gradually increases and the molecular weight increases as well. The absorption peak of pyrene homopolymer after 300 nm has a long tail, extending to about 600 nm. This may be due to a wide distribution of polymer molecular weight. But as the pyrrole content increases in the copolymer, the tailing effect of the copolymer absorption peak weakens, indicating that the distribution of molecular weight of copolymers becomes narrow. Therefore, the addition of pyrrole monomers can promote the formation of copolymers with better planar conjugation, higher molecular weight and narrower distribution of molecular weight.

Figure 7:
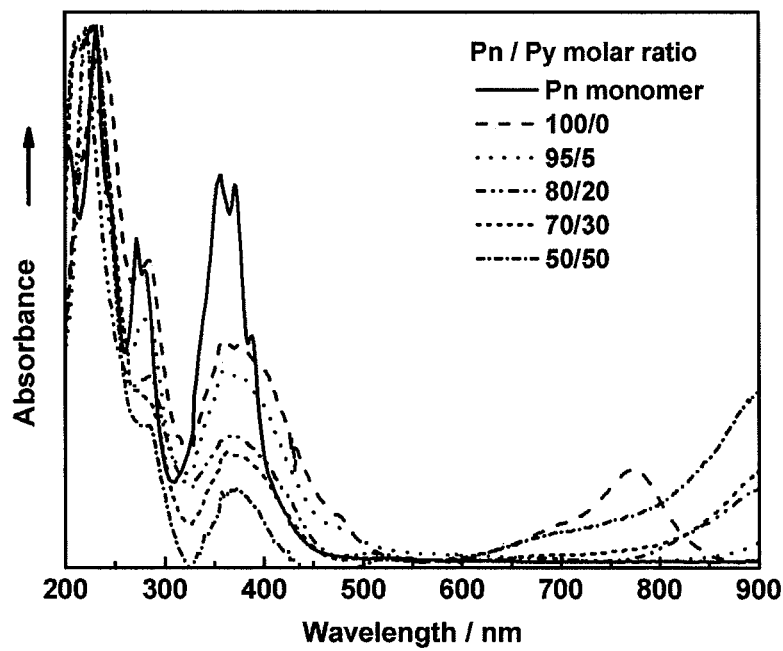
FIG. 7 shows the UV-Vis spectra of pyrene monomer, pyrene homopolymers, pyrrole homopolymers, and copolymers of different molar ratios of pyrene to pyrrole, all of which dissolved in concentrated $H_2SO_4$.

FIG. 7 shows the UV-Vis absorption spectra of copolymer solutions in concentrated sulfuric acid. The concentrated sulfuric acid can increase the solubility of the copolymers. Thus the absorption spectra in concentrated sulfuric acid can better reflect the electron transition, and the effects of pyrrole units on the molecular structure of the copolymer. In FIG. 7, pyrene monomer shows 4 distinct peaks at 231, 272, 356 and 370 nm, respectively. The polymers (including homopolymers and copolymers) show weakened peaks at 272, 356 and 370 nm, respectively, accompanied by an obvious red shift, as well as a new peak emerging at 600 nm. This is caused by polaron transition in the polymers, indicating that the polymerization of monomers extends the conjugation.

The UV-Vis data are shown in Table 3. The ratio of the maximum absorption peak between 350 nm and 400 nm to the maximum absorption peak at or below 300 nm ($A_{max(350-400\,nm)}/A_{max<300\,nm}$) is calculated. The results show that the ratio decreases as the pyrrole content increases, suggesting that pyrrole units change the composition of the polymer chain. Absorption peaks of the copolymers after 600 nm show significant red shift when compared with the peaks of the pyrene homopolymer, which indicates that addition of pyrrole can increase the copolymer length and degree of polymerization. The ratio of the maximum absorption peak at 880 nm to the maximum absorption peak at or below 300 nm ($A_{800\,nm}/A_{max<300\,nm}$) increases as the pyrrole content increases, which is consistent with the above observation. In addition, the wave length ($\lambda_{onset}$) of the onset location of the absorption peak shows a non-linear change as the molar ratio of the two monomers changes, indicating that pyrene and pyrrole copolymerized and the two monomers interact with each other to affect the molecular chain structure. These results are consistent with the infrared analysis results, and also correspond to the tendency of change in electrical conductivity in innate state as shown in FIG. 1.

Example 7

UV Absorption Spectrum of Copolymer 80/20 Under Different Temperatures

Figure 8:
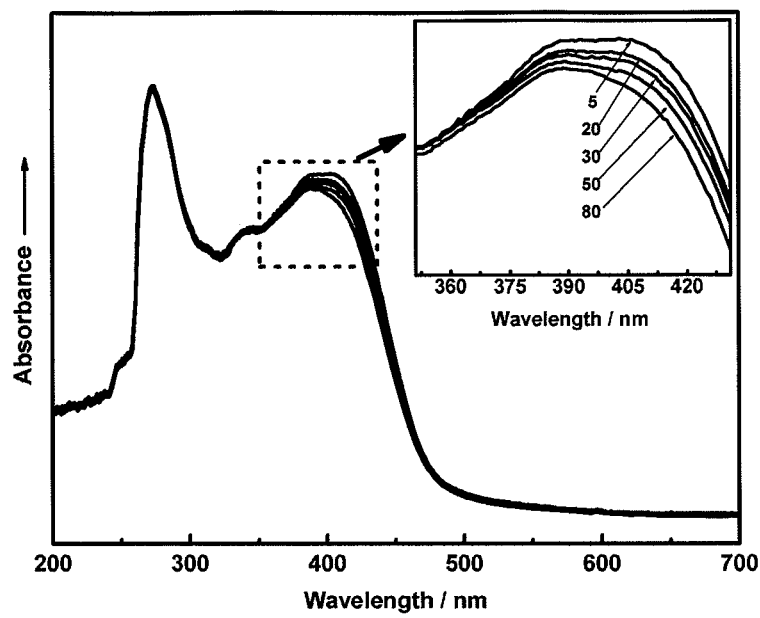
FIG. 8 shows the UV-Vis spectra of copolymer 80/20 dissolved in NMP at testing temperatures ranging from 5° C. to 80° C.

UV absorption of copolymer solutions at different temperatures is studied to investigate the linking structure of the copolymer chain. Copolymer 80/20 obtained in Example 1 is dissolved in NMP and studied using UV-Vis spectroscopy. The results are shown in FIG. 8. The absorption peak of the copolymer at 400 nm gradually weakened as the temperature rises from 5° C. to 80° C., indicating that the degree of conjugation is gradually decreasing. It is possible that at an elevated temperature, the molecular chain of the copolymer can gain higher energy and increased thermal motion, which lead to a certain degree of distortion in the chain structure and therefore destroy the planar conjugated structure. This proves from another aspect that the linkage between the monomer units are linear, with few branches or crosslinking structures, and the units can rotate through single bonds so as to form a conformation stable under an elevated temperature.

Example 8

UV Absorption Spectrum of Copolymer 80/20 Solution of Different Concentrations

Figure 9:
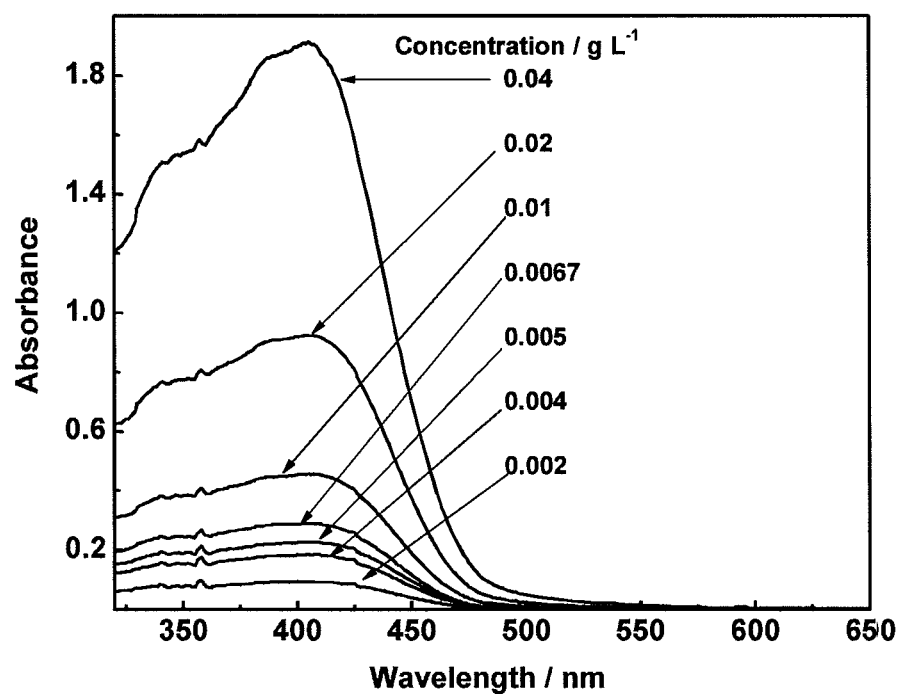
FIG. 9 shows the UV-Vis spectra of copolymer 80/20 dissolved in NMP at different concentrations ranging from 0.002 g/L to 0.4 g/L.

UV absorption of copolymer solutions of different concentrations is studied to calculate the absorption coefficient. Copolymer 80/20 is dissolved in NMP and studied using UV-Vis spectroscopy. The results are shown in FIG. 9. The absorption coefficient is calculated using the following equation (5):

$$a = \frac{A}{bc}$$

in which a is the absorption coefficient (L/g·cm), A is the absorbance, b is the optical path length of the absorption cell (cm), and c is the concentration of the light-absorbing agent.

Figure 10:
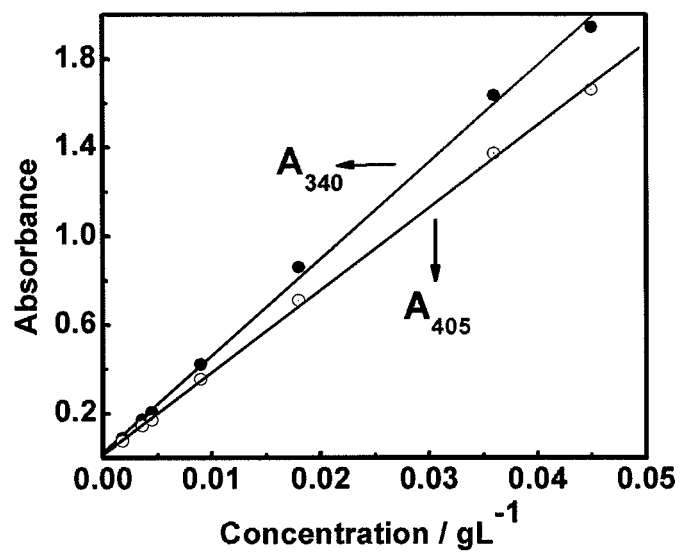
FIG. 10 shows the linear correlation between copolymer 80/20 concentration and UV absorption at 340 nm and 405 nm, respectively.

The absorbance shows good linear correlation with concentration in the concentration range of 0-0.05 g/L (FIG. 10). Absorbance at 340 nm and at 405 nm are used respectively to calculate the absorption coefficient. The linear regression equations are: $A_{340}=0.00781+0.03738c$ (R=0.9999); $A_{405}=-0.01596+0.04798c$ (R=0.9998). The calculated absorption coefficients are: $a_{340}=37.4\,L\cdot g^{-1}\cdot cm^{-1}$, $a_{405}=48.0\,L\cdot g^{-1}\cdot cm^{-1}$, respectively.

Example 9

Fluorescence of Pyrene/Pyrrole Copolymers

The fluorescence of pyrene monomer solution and various copolymer solutions are observed. An equal weight amount

TABLE 3

Analysis data of the UV-vis spectra of Pyre/Pyrr copolymers.

| | Pyre monomer | Polymer | | | | |
|---|---|---|---|---|---|---|
| | | 100/0 | 95/5 | 80/20 | 70/30 | 50/50 |
| $A_{max(350-400\,nm)}/A_{max(<300\,nm)}$ | 0.72 (356)* | 0.42 (360) | 0.36 (361) | 0.24 (362) | 0.20 (364) | 0.13 (368) |
| $A_{880\,nm}/A_{max(<300\,nm)}$ | — | — | 0.02 | 0.11 | 0.14 | 0.28 |
| $\lambda_{onset}$ (nm) | — | 563 | 800 | 756 | 600 | 500 |

Figure 11:
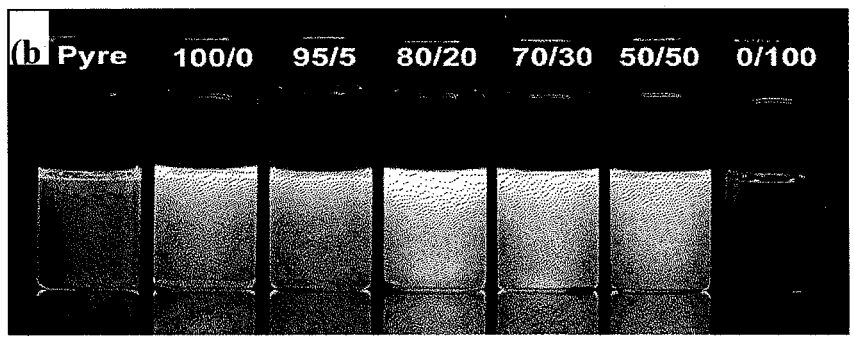
FIG. 11 shows pictures of pyrene monomers solution and polymers solutions in NMP under UV light exposure.

*data in brackets is the wavelength of maximal absorption from 350-400 nm.

of pyrene monomer and copolymers are dissolved in NMP solution, respectively. Pyrene monomer is readily dissolved in NMP, while homopolymers and copolymers are partially dissolved in NMP, and the sediment portion in the bottom is the high-molecular weight portion of the polymers. Pictures are taken under UV light, respectively. The results are shown in FIG. 11. The fluorescence of the polymer solutions are stronger than that of the pyrene monomer solution. The copolymers show different fluorescent colors in the solutions. As the pyrrole content increases in the copolymer, the fluorescence of the copolymer shifts toward the longer wave length region, and changes from blue to yellowish green. This is because incorporation of pyrrole increases the molecular weight of the copolymers and improves planar conjugation. The change in copolymer fluorescence color proves the copolymerization between pyrene and pyrrole, but also reflects the effects of pyrrole on the copolymer structure.

It is notable that, when observed by naked eyes, the fluorescence of copolymer 80/20 and copolymer 70/30 is the brightest, i.e. has the highest fluorescence intensity. This may be explained in two aspects: 1) addition of a suitable amount of pyrrole reduces the π-stack of polymer chains, and increases the polymer solubility; and 2) the copolymers have improved planar conjugation and thus the fluorescence intensity increases.

Figure 12:
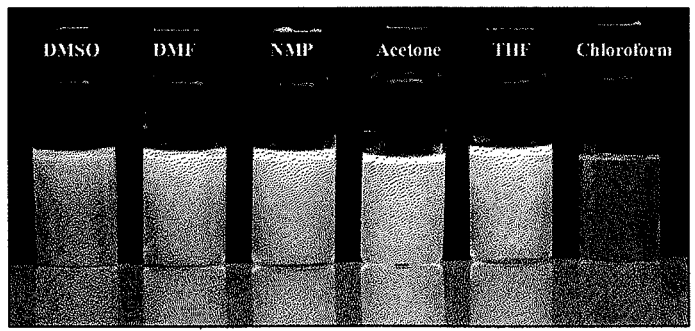
FIG. 12 shows the pictures of the copolymer 80/20 solutions under UV light exposure, which copolymer is dissolved in DMSO, DMF, NMP, Acetone, THF and Chloroform, respectively.

Fluorescence emission of copolymer 80/20 in different solvents are also studied. Copolymer 80/20 is dissolved in different solvents and pictures are taken under sunlight and UV light, respectively (FIG. 12). The tested solvents include: DMSO, NMP, acetone, THF, and $CHCl_3$. The copolymer shows poor solubility in $CHCl_3$, and the resulting solution is oligomer solution which emits blue fluorescence with low intensity. Other solutions show green or bluish green fluorescence with higher intensity. The results show that, different solvents can affect the fluorescence of the copolymers. The fluorescence emission of the copolymer solution moves toward a longer wave length when the copolymer is dissolved in a solvent with a higher dielectric constant. The tested solvents are ranked according to their dielectric constant as follows: DMSO>DMF>NMP>acetone>THF>$CHCl_3$. FIG. 12 shows, the copolymer solution in DMSO emits fluorescence of the longest wave length, which is yellowish green, and the others emit fluorescence of descending order of wave lengths.

Figure 13:
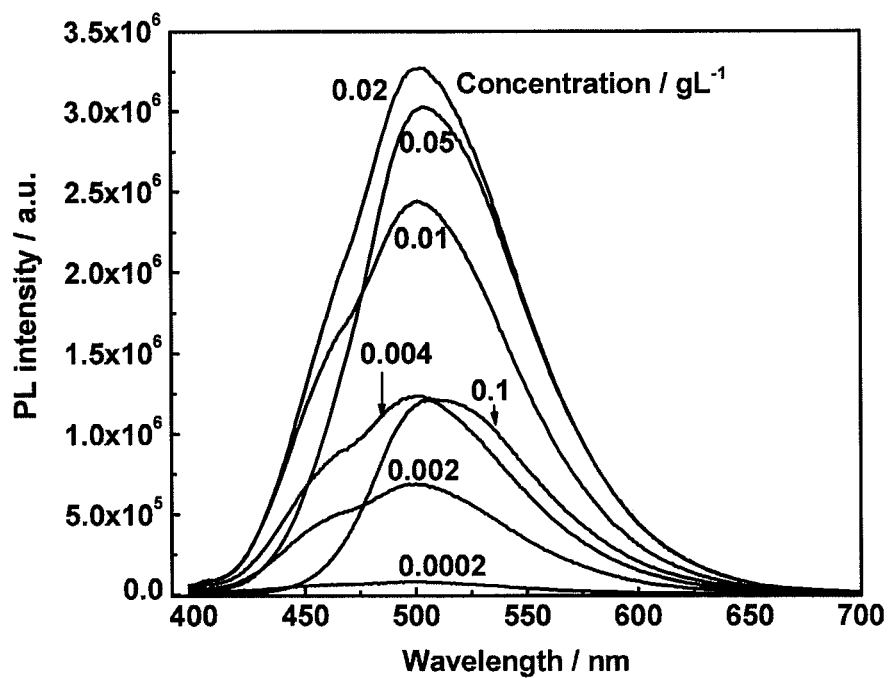
FIG. 13 shows the photoluminescence spectra of the copolymer solutions under an excitation wave length of 370 nm, which copolymer is dissolved in NMF at concentrations of 0.0002 g/L, 0.002 g/L, 0.004 g/L, 0.01 g/L, 0.02 g/L, 0.05 g/L, and 0.1 g/L, respectively.
Figure 14:
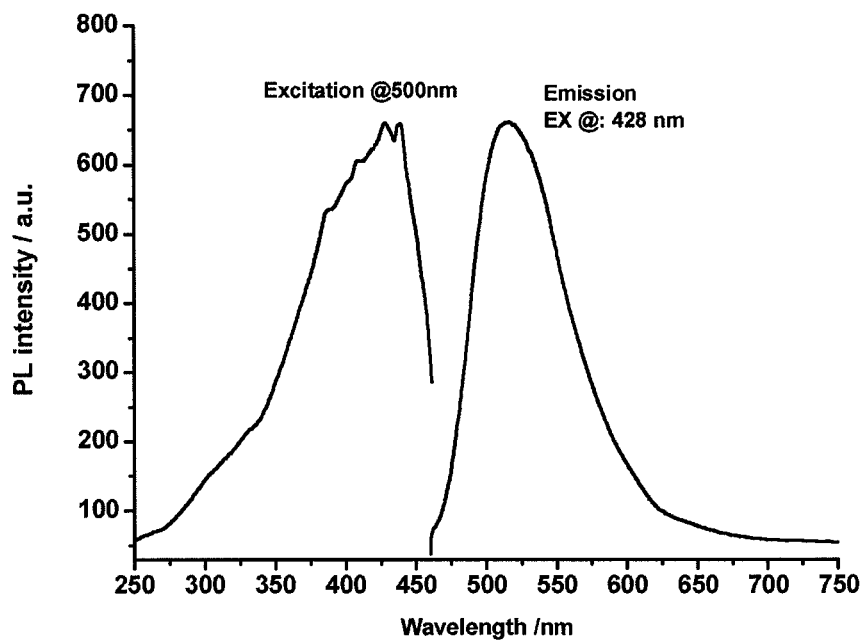
FIG. 14 shows the fluorescence excitation spectra of the copolymer 80/20 solution at 500 nm and fluorescence emission spectra at 428 nm, which copolymer is dissolved in NMF at a concentration of 0.018 g/L.

Fluorescence emission of copolymer 80/20 solutions of different concentrations are also studied. Copolymer 80/20 is dissolved in NMP to prepare solutions of different concentrations: 0.0002 g/l, 0.002 g/l, 0.004 g/l, 0.01 g/l, 0.02 g/l, 0.05 g/l, and 0.1 g/l. The pictures are taken under UV light, respectively, and the fluorescence emission spectra are also measured. The fluorescence emission spectra results show that the copolymer solution has the highest fluorescence intensity at the concentration of 0.02 g/L (FIG. 13). The excitation spectrum and the emission spectrum are measured for copolymer 80/20 at the concentration of 0.018 g/L. The results show that the excitation spectrum and the emission spectrum are in good symmetry (FIG. 14).

Example 10

Char Yields of the Pyrene/Pyrrole Copolymers

Pyrene/pyrrole copolymers synthesized by the method described in Example 1 are tested for their char yields using thermogravimetric (TG) analysis. The copolymers are heated from room temperature to 1,000° C. at the rate of 10° C./min in the presence of nitrogen. During the heating process, weight changes of the copolymer and the temperature changes are monitored and recorded. After the temperature reached 1,000° C., the residue of the copolymer is measured for weight and the ratio of the residue weight and the weight of the original copolymer is calculated as the char yield.

Figure 15:
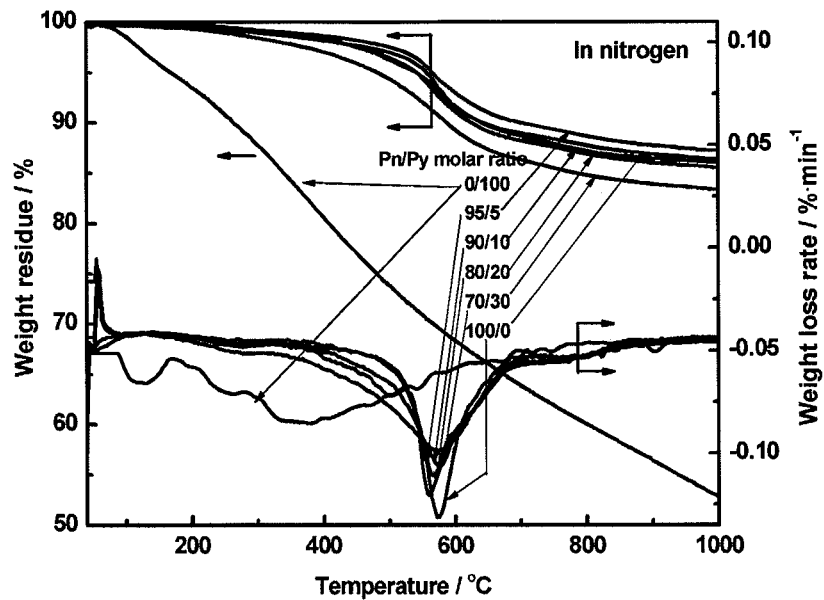
FIG. 15 shows the thermal stability results of the copolymers in thermogravimetric analysis and differential thermogravimetric analysis.

FIG. 15 shows the thermal stability results of the copolymers in TG analysis, and Table 4 shows the thermal decomposition temperatures and char yields. All tested copolymers exhibit high thermal stability, including initial decomposition temperature of above 350° C., and the temperature at the maximal weight-loss rate (i.e. thermal decomposition temperature) of above 560° C. The char yields of all tested copolymers at 1000° C. in $N_2$ are above 83%. As the pyrene feed content increases from 0% to 100%, the char yield of the resulting polymers increases at first and slightly declines, with the maximum char yield found as 87.6% for copolymer 95/5. The maximum char yield is much higher than that of conventional carbon precursors and aromatic polymers, and is much higher than the theoretical carbon content of pyrrole monomer of 71.5% and close to the theoretical carbon content of pyrene monomer of 95.1%. The high thermal stability and very high char yields of these copolymers can be ascribed to their high aromaticity.

TABLE 4

The yield and electrical conductivity of the char based on pyrene/pyrrole copolymer at 1000° C. in nitrogen.

| Molar ratio of pyrene to pyrrole | Thermal decomposition temperature (° C.) | Char yield at 1000° C. (%) | Electrical conductivity of the char (S/cm) |
| --- | --- | --- | --- |
| 100/0 | 573 | 86.7 | 10.2 |
| 95/5 | 566 | 87.6 | 19.6 |
| 90/10 | 577 | 86 | 23.2 |
| 80/20 | 559 | 85.5 | 8.38 |
| 70/30 | 574 | 83.8 | 6.37 |
| 0/100 | 377 | 53.1 | 6.08 |

On the other hand, the electric conductivity of the char of the copolymers is also tested. As the pyrene feed content increases, the resulting copolymers show an initial increase in electric conductivity of the char and then a slight decline after reaching the maximum up to 23.2 S $cm^{-1}$ for copolymer 90/10 (Table 4).

Figure 16:
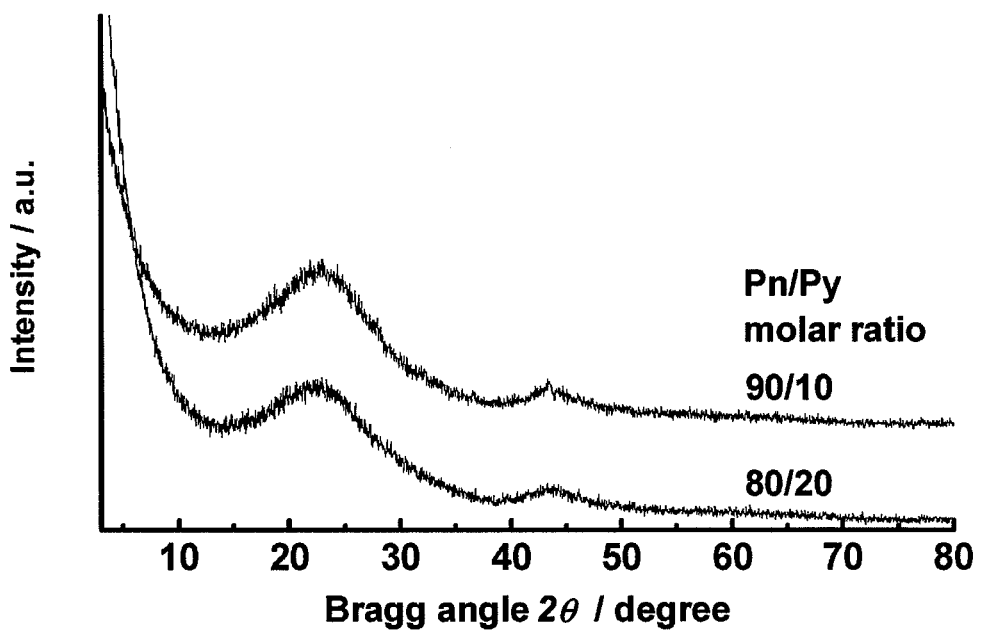
FIG. 16 shows the X-ray diffraction patterns for the chars obtained from two pyrene/pyrrole copolymers after heating to 1000° C.

Chars are obtained for copolymer 90/10 and copolymer 80/20 after heating to 1000° C. in nitrogen, and the obtained chars are tested using wide-angle X-ray diffraction. FIG. 16 shows X-ray diffractograms of the chars of copolymer 90/10 and copolymer 80/20. The results show two broad diffraction peaks centered at 23.0° and 43.4°, which correspond to two diffractions of the graphite structure, respectively. The amorphous carbon is predominant in the char, but it could be predicted that the crystallinity and thus conductivity of the chars would be further enhanced if the heat treatment temperature is elevated up to 2200° C. because the amorphous carbon would be transformed to highly ordered graphite at 2200° C.

Example 11

Structure Analysis of Pyrene/Pyrrole Copolymer 80/20

Figure 17:
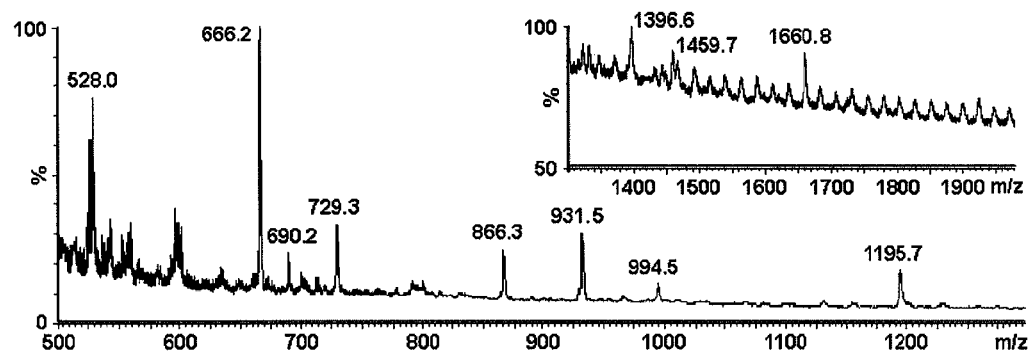
FIG. 17 shows the MALDI-TOF (Matrix-assisted laser desorption/ionization—Time-of-flight) mass spectra of copolymer 80/20.

Pyrene/pyrrole copolymer 80/20 synthesized by the method described in Example 1 are analyzed by MALDI-TOF mass spectra. In brief, copolymer 80/20 obtained by the method described in Example 1 is dissovled in THF with anthralin as the matrix, and then loaded to a MALDI-TOF mass spectrometer, in which the copolymers are ioninzed and then accelerated by an electric field of known strength before reaching the detector. The mass-to charge ratio (m/z value) of the ionized copolymers are calculated based on the time it takes for the ionized copolymers to reach the dector. The results are shown in FIG. 17.

Possible structures of the copolymers are deduced from the m/z values of the outstanding peaks, and some deductions are listed in Table 5 below.

art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology

| m/z | Possible copolymer structure and calculation of the m/z value |
|---|---|
| 528.0 | 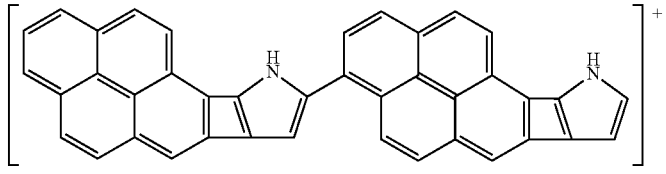<br>200.25 + 64.09 + 199.25 + 65.09 = 528.7 |
| 994.5 | 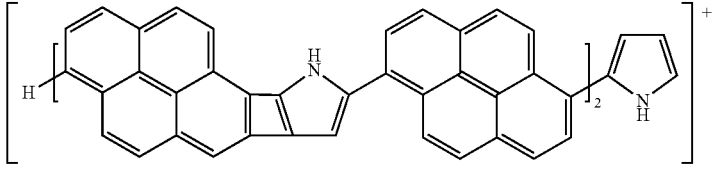<br>1 + 2(199.25 + 64.09 + 200.25) + 66.09 = 994.3 |
| 1396.6 | 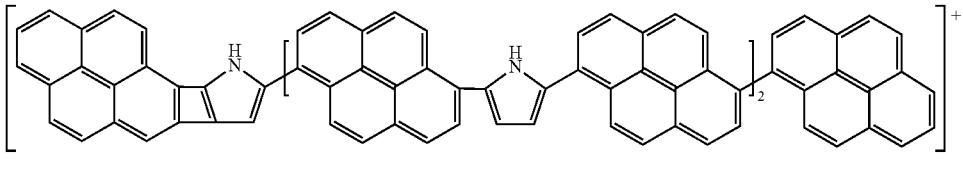<br>201.25 + 199.25 + 64.09 + 200.25 + 65.09 + 200.25 + 65.09 + 200.25 + 201.25 + 1 = 1396.8 |
| 1459.7 | 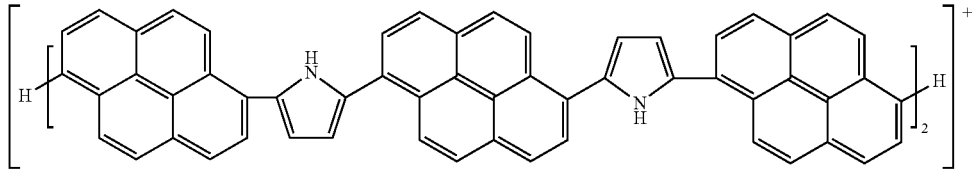<br>1 + 2(200.25 + 65.09 + 200.25 + 65.09 + 199.25) + 1 = 1459.9 |
| 1660.8 | 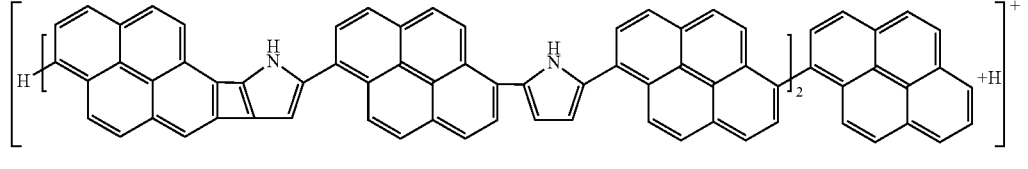<br>1 + 2(199.25 + 64.09 + 200.25 + 65.09 + 200.25) + 201.25 + 1 = 1660.1 |

General

The present disclosure is not to be limited in terms of the particular embodiments described in this application, which are intended as illustrations of various aspects. Many modifications and variations can be made without departing from its spirit and scope, as will be apparent to those skilled in the used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A copolymer comprising one or more units of pyrene and one or more units of pyrrole, wherein at least one of the one or more units of pyrene and at least one of the one or more units of pyrrole are bonded together via

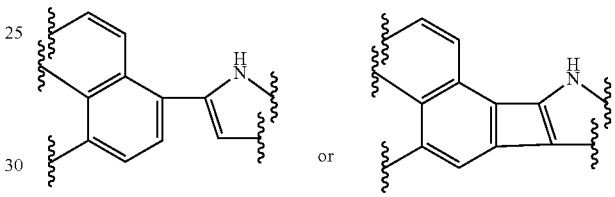

linkages in the copolymer.

2. The copolymer of claim 1, wherein the molar ratio of pyrene to pyrrole in the copolymer is from 99:1 to 30:70.

3. The copolymer of claim 2, wherein the molar ratio of pyrene to pyrrole in the copolymer is 80:20 to 50:50.

4. The copolymer of claim 1, wherein pyrene and pyrrole are distributed randomly on the copolymer.

5. The copolymer of claim 1, wherein the copolymer has the following structure:

wherein:

-Pyrene-Pyrrole- is selected from the group consisting of

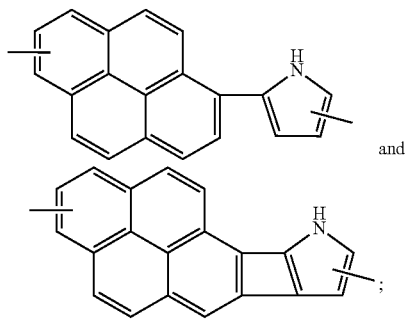

each A is independently selected from the group consisting of: nothing,

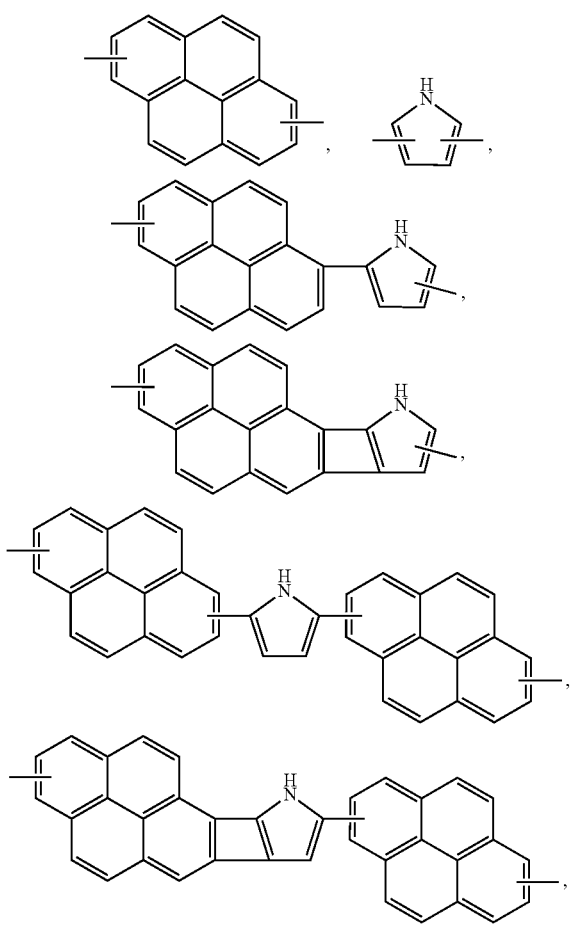
each B is independently selected from the group consisting of: nothing,
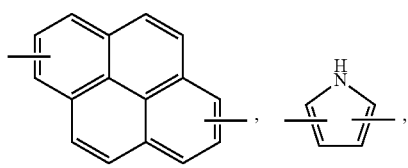
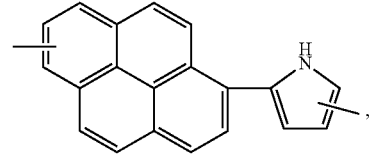
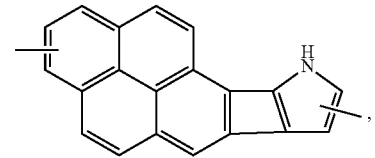
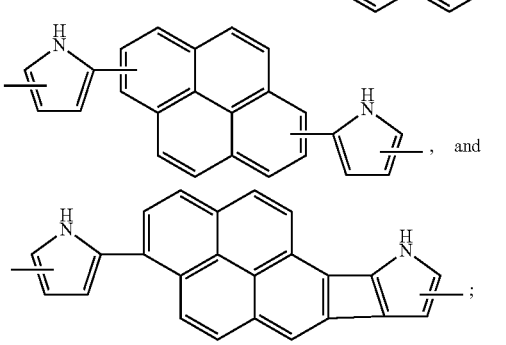
n is any integer from 1 to 40;
$R_1$ is selected from the group consisting of: H,
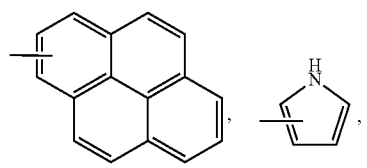
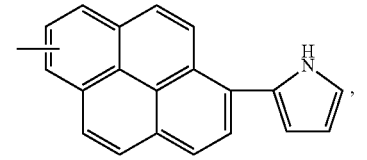
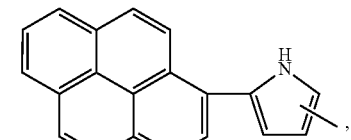
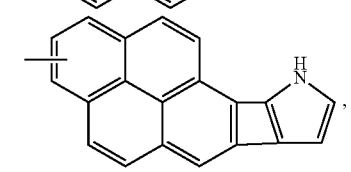

-continued
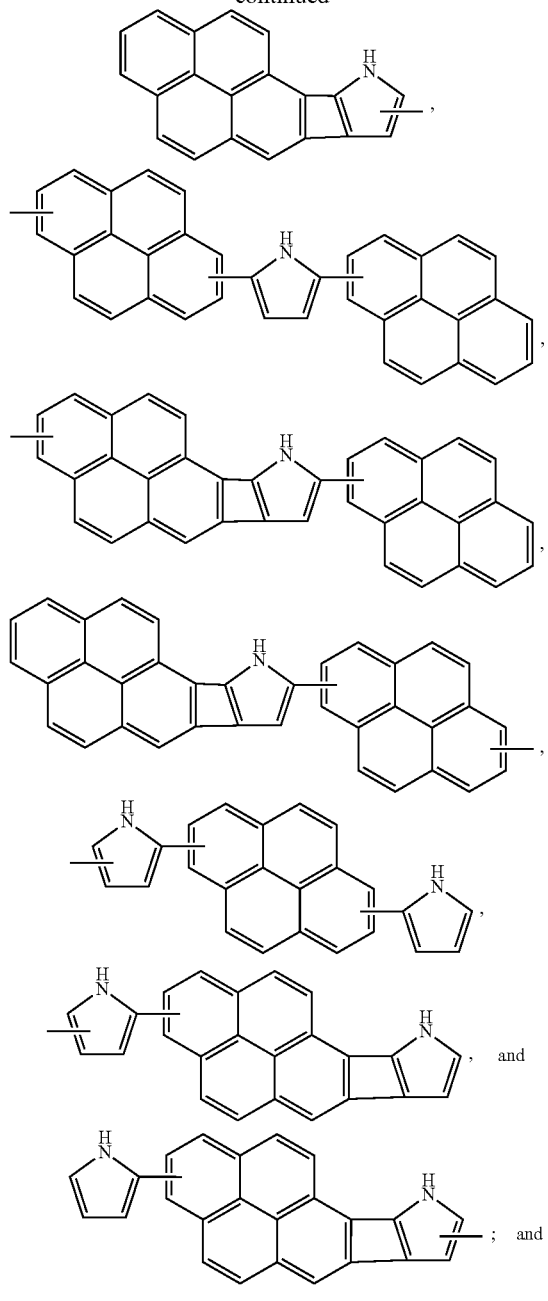
$R_2$ is selected from the group consisting of: H,
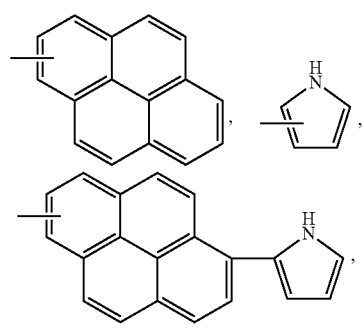
-continued
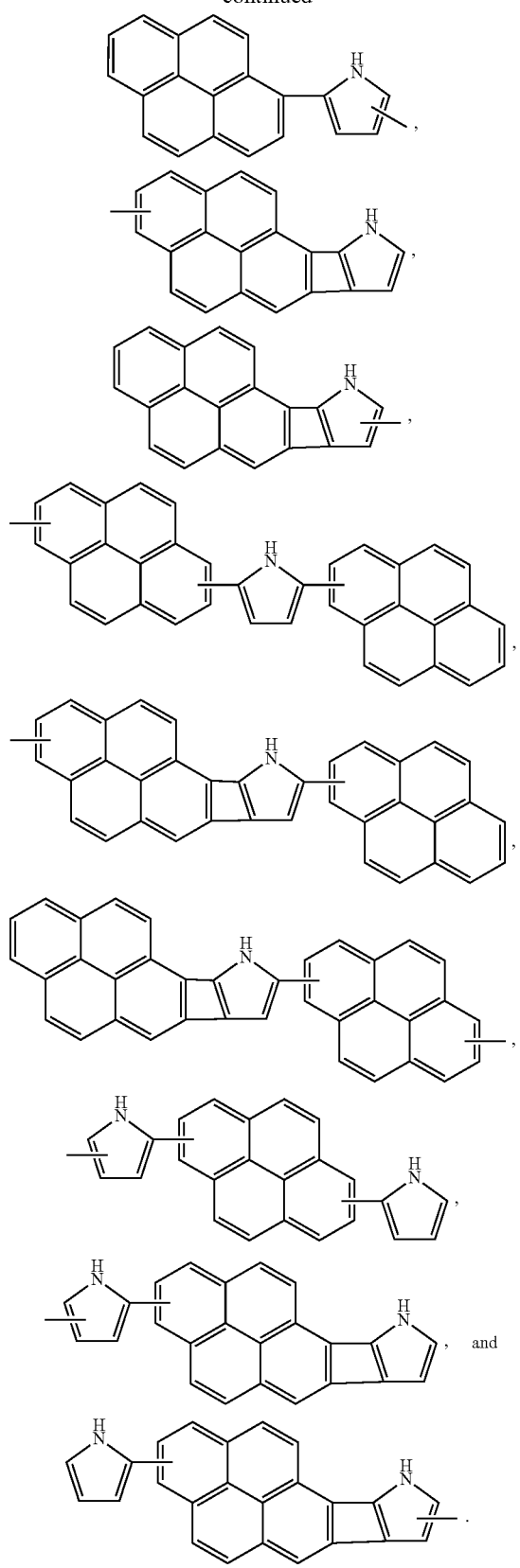
6. The copolymer of claim 5, wherein the copolymer is selected from the group consisting of:

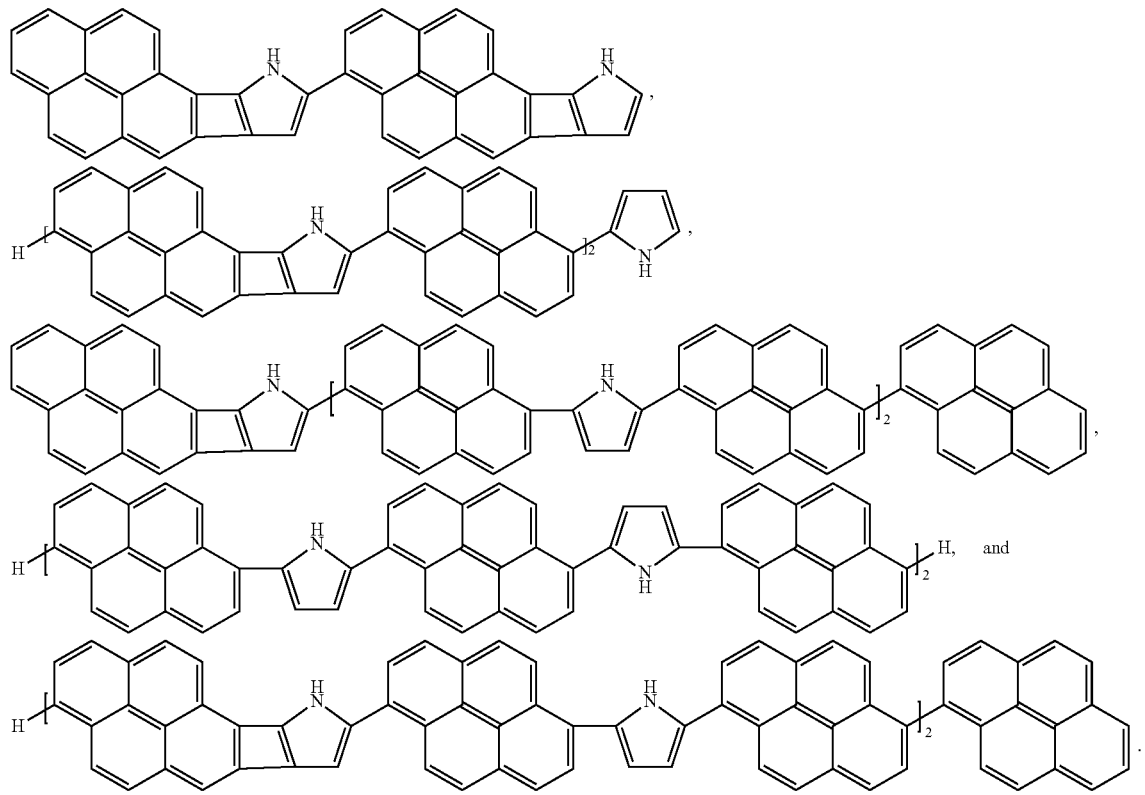

7. The copolymer of claim 1, wherein the copolymer is linear.

8. The copolymer of claim 1, wherein the copolymer is branched.

9. The copolymer of claim 1, wherein the copolymer has a weight average molecular weight of about 500 Da to 10000 Da.

10. The copolymer of any of claim 1, wherein the copolymer has a thermal decomposition temperature between 400° C. and 800° C.

11. The copolymer of claim 1, wherein the copolymer has an electrical conductivity between $10^2$ and $10^{-11}$ S cm$^{-1}$.

12. The copolymer of claim 1, wherein the copolymer has char yield at 1000° C. between 70% and 95%.

13. The copolymer of claim 1, wherein 5% to 100% of the copolymer is soluble in organic solvent.

14. The copolymer of claim 13, wherein the organic solvent is selected from the group consisting of N-methylpyrrolidone (NMP), tetrahydrofuran (THF), chloroform, dimethylformamide (DMF), and dimethylsulfoxide (DMSO).

15. The copolymer of claim 1, wherein the copolymer has UV absorbance peaks at wavelengths ranging from 250 nm to 800 nm.

16. The copolymer of claim 1, wherein the copolymer has fluorescence emission peaks at wavelengths ranging from 400 nm to 700 nm.

17. A method of producing a copolymer comprising one or more units of pyrene and one or more units of pyrrole, comprising incubating pyrene monomers and pyrrole monomers with an oxidant in the presence of a reaction solvent, wherein at least one of the one or more units of pyrene and at least one of the one or more units of pyrrole are bonded together via

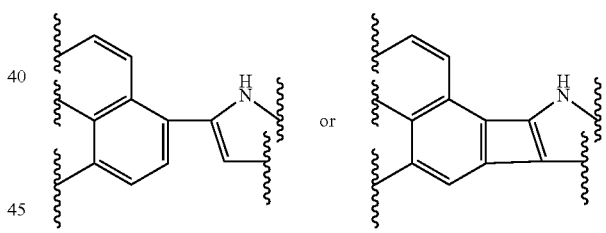

linkages in the copolymer.

18. The method of claim 17, wherein the oxidant is selected from the group consisting of FeCl$_3$, FeBr$_3$, AlCl$_3$, AlBr$_3$, AlI$_3$, CuCl$_2$, CuBr$_2$, MoCl$_5$, SnCl$_4$, SnBr$_4$, SnI$_4$, MgCl$_2$, MgBr$_2$, MgI$_2$, CaCl$_2$, CaBr$_2$, CaI$_e$, ZnCl$_2$, ZnBr$_2$, ZnI$_2$, BF$_3$, TiCl$_4$, TiBr$_4$, SbCl$_5$, and any combination thereof.

19. The method of claim 18, wherein the oxidant is FeCl$_3$.

20. The method of claim 17, wherein the reaction solvent is selected from the group consisting of nitroalkanes, aromatic nitro compounds, hydrocarbons, halogenated hydrocarbons, nitriles, and any combination thereof.

21. The method of claim 17, wherein the molar ratio of the oxidant to the total amount of monomers is from 1:1 to 9:1.

22. The method of claim 17, wherein the incubation temperature is from 10° C. to 100° C.

23. The method of claim 17, wherein the incubation time is from 1 to 48 hours.

* * * * *

UNITED STATES PATENT AND TRADEMARK OFFICE
CERTIFICATE OF CORRECTION

| | |
|---|---|
| PATENT NO. | : 8,907,015 B2 |
| APPLICATION NO. | : 13/133936 |
| DATED | : December 9, 2014 |
| INVENTOR(S) | : Li et al. |

It is certified that error appears in the above-identified patent and that said Letters Patent is hereby corrected as shown below:

On the Title Page, in item (56), under "OTHER PUBLICATIONS", in Column 2, Line 2, delete "Compunds"," and insert -- Compounds", --, therefor.

On the Title Page, in the Figure, delete "pontential" and insert -- potential --, therefor.

On Title Page 2, in item (56), under "OTHER PUBLICATIONS", in Column 1, Line 27, delete "Biooganic" and insert -- Bioorganic --, therefor.

On Title Page 2, in item (56), under "OTHER PUBLICATIONS", in Column 1, Line 32, delete "Matterals"," and insert -- Materials", --, therefor.

On Title Page 2, in item (56), under "OTHER PUBLICATIONS", in Column 2, Line 54, delete "Repid" and insert -- Rapid --, therefor.

In the Drawings

In Fig. 1, Sheet 1 of 10, delete "pontential" and insert -- potential --, therefor.

In the Specification

In Column 1, Line 35, delete "suppercapacitors," and insert -- supercapacitors, --, therefor.

In Column 7, Line 49, delete ""Maldi-T of" and insert -- "Maldi-Tof --, therefor.

In Column 7, Line 50, delete "Springer-Verla;" and insert -- Springer-Verlag; --, therefor.

In Column 8, Line 43, delete "Copolymers" and insert -- copolymers --, therefor.

Signed and Sealed this
Second Day of June, 2015

Michelle K. Lee
*Director of the United States Patent and Trademark Office*

CERTIFICATE OF CORRECTION (continued)
U.S. Pat. No. 8,907,015 B2

In Column 12, Line 21, delete "benenze," and insert -- benzene, --, therefor.

In Column 17, Line 15, delete "Handbook" and insert -- Handbook. --, therefor.

In Column 19, Line 9, delete "elutant" and insert -- eluent --, therefor.

In Column 19, Line 12, delete "eluant" and insert -- eluent --, therefor.

In Column 25, Line 6, delete "LTV" and insert -- UV --, therefor.

In Column 27, Line 1, delete "dissovled" and insert -- dissolved --, therefor.

In Column 27, Line 3, delete "ioninzed" and insert -- ionized --, therefor.

In Column 27, Line 7, delete "dector." and insert -- detector. --, therefor.

In the Claims

In Column 35, Line 41, in Claim 10, delete "of any of" and insert -- of --, therefor.

In Column 36, Line 52, in Claim 18, delete "$CaI_e$," and insert -- $CaI_2$, --, therefor.